(12) United States Patent
Kawashima et al.

(10) Patent No.: US 9,288,314 B2
(45) Date of Patent: Mar. 15, 2016

(54) CALL EVALUATION DEVICE AND CALL EVALUATION METHOD

(71) Applicant: FUJITSU LIMITED, Kawasaki (JP)

(72) Inventors: Naoto Kawashima, Yokohama (JP);
Naoto Matsudaira, Yokohama (JP);
Yuusuke Tounai, Nishi (JP); Hiroshi Yoshida, Yokohama (JP); Shingo Hirono, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/025,193

(22) Filed: Sep. 12, 2013

(65) Prior Publication Data

US 2014/0093056 A1    Apr. 3, 2014

Related U.S. Application Data

(63) Continuation of application No. PCT/JP2011/056662, filed on Mar. 18, 2011.

(51) Int. Cl.
| | | |
|---|---|---|
| *H04M 1/64* | (2006.01) | |
| *H04M 3/42* | (2006.01) | |
| *H04M 3/51* | (2006.01) | |
| *H04M 3/22* | (2006.01) | |

(52) U.S. Cl.
CPC ........ *H04M 3/42221* (2013.01); *H04M 3/5175* (2013.01); *H04M 3/2281* (2013.01)

(58) Field of Classification Search
USPC ............ 370/252–352, 410–467; 379/88–265; 704/233–275
See application file for complete search history.

(56) References Cited

U.S. PATENT DOCUMENTS

| | | | |
|---|---|---|---|
| 6,292,555 B1 * | 9/2001 | Okamoto ................. | 379/265.01 |
| 7,284,128 B2 * | 10/2007 | Sako ............................. | 713/176 |
| 7,460,652 B2 * | 12/2008 | Chang ......................... | 379/88.18 |
| 7,519,074 B2 * | 4/2009 | Ward et al. ..................... | 370/410 |
| 8,050,923 B2 * | 11/2011 | Blair ............................. | 704/251 |
| 8,165,874 B2 * | 4/2012 | Kurata et al. ................. | 704/233 |
| 8,325,884 B2 * | 12/2012 | Bushey et al. ............ | 379/88.01 |
| 2001/0032211 A1 | 10/2001 | Kuzumaki | |

(Continued)

FOREIGN PATENT DOCUMENTS

| | | |
|---|---|---|
| JP | 2001-297259 | 10/2001 |
| JP | 2003-298748 | 10/2003 |

(Continued)

OTHER PUBLICATIONS

International Search Report mailed May 24, 2011 in corresponding International Application No. PCT/JP2011/056662.

(Continued)

*Primary Examiner* — Man Phan
(74) *Attorney, Agent, or Firm* — Staas & Halsey LLP

(57) ABSTRACT

An call evaluation device pairs an utterance of the first speaker and an utterance of the second speaker, which are associated with the same screen identification information, to be a question and answer, obtains a totalized value of the number of question and answers for each screen identification information and an utterance time of the second speaker for each question and answer, and generates display information to cause an output device to display the totalized value of the number of question and answers for each screen identification information and the utterance time of the second speaker for each question and answer.

5 Claims, 30 Drawing Sheets

(56) References Cited

U.S. PATENT DOCUMENTS

| | | | |
|---|---|---|---|
| 2004/0032941 A1* | 2/2004 | Graham et al. | 379/219 |
| 2008/0167952 A1* | 7/2008 | Blair | 705/11 |
| 2008/0310603 A1* | 12/2008 | Wu et al. | 379/88.13 |
| 2009/0228268 A1 | 9/2009 | Kurata et al. | |
| 2013/0197912 A1* | 8/2013 | Hayakawa et al. | 704/246 |
| 2014/0010360 A1* | 1/2014 | Kawashima et al. | 379/265.03 |

FOREIGN PATENT DOCUMENTS

| | | |
|---|---|---|
| JP | 2003-308423 | 10/2003 |
| JP | 2004-157253 | 6/2004 |
| JP | 2004-157733 | 6/2004 |
| JP | 2007-33754 | 2/2007 |
| JP | 2007-58767 | 3/2007 |
| JP | 2007-228271 | 9/2007 |
| JP | 2007-228272 | 9/2007 |
| JP | 2007-288242 | 11/2007 |
| JP | 2007-288469 | 11/2007 |
| JP | 2009-216840 | 9/2009 |
| JP | 2009-290531 | 12/2009 |

OTHER PUBLICATIONS

Japanese Office Action mailed Jun. 17, 2014 in corresponding Japanese Patent Application No. 2013-505667.
PCT International Preliminary Report on Patentability mailed Oct. 3, 2013 in corresponding International Application No. PCT/JP2011/056662.

* cited by examiner

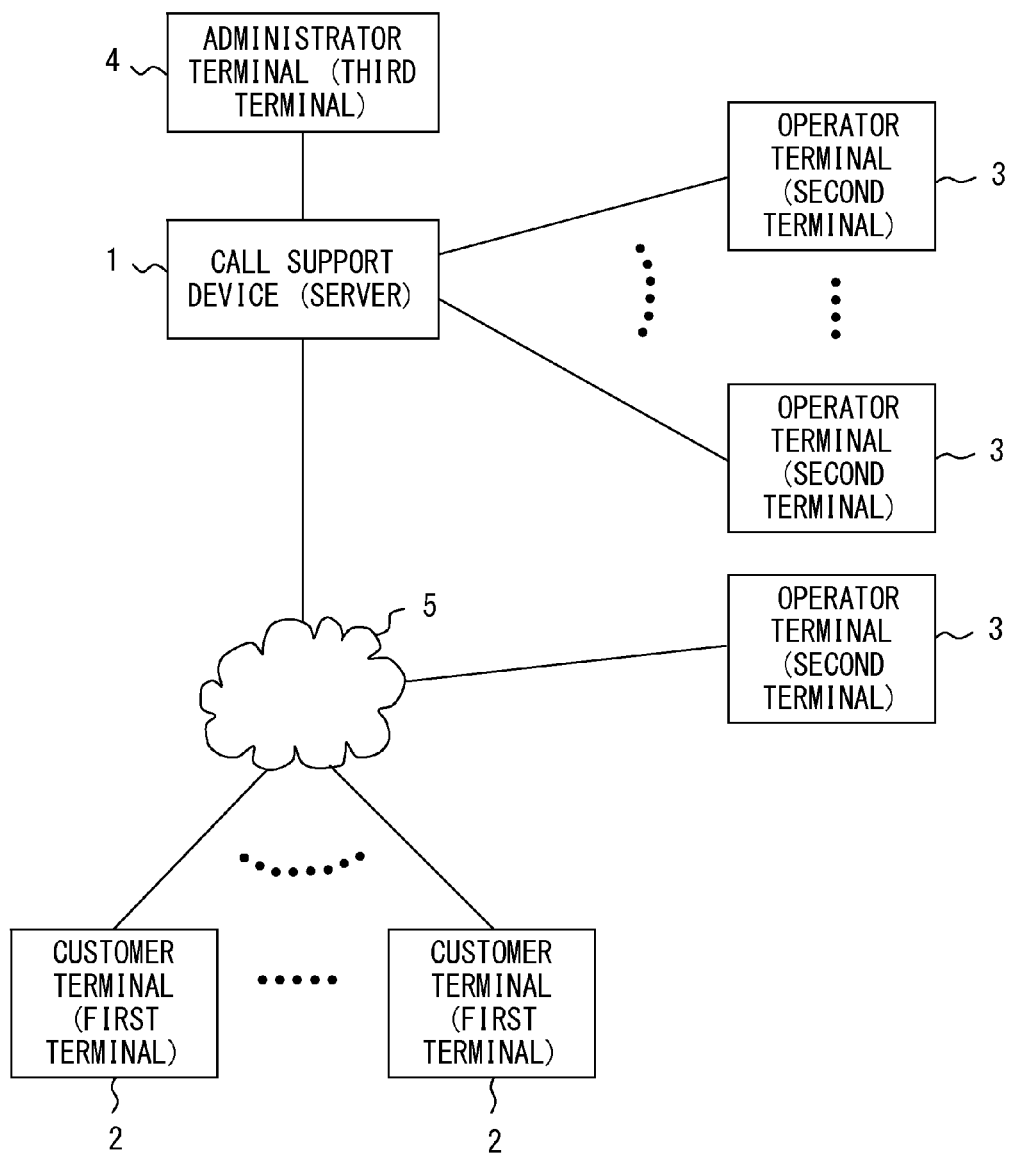
F I G. 1

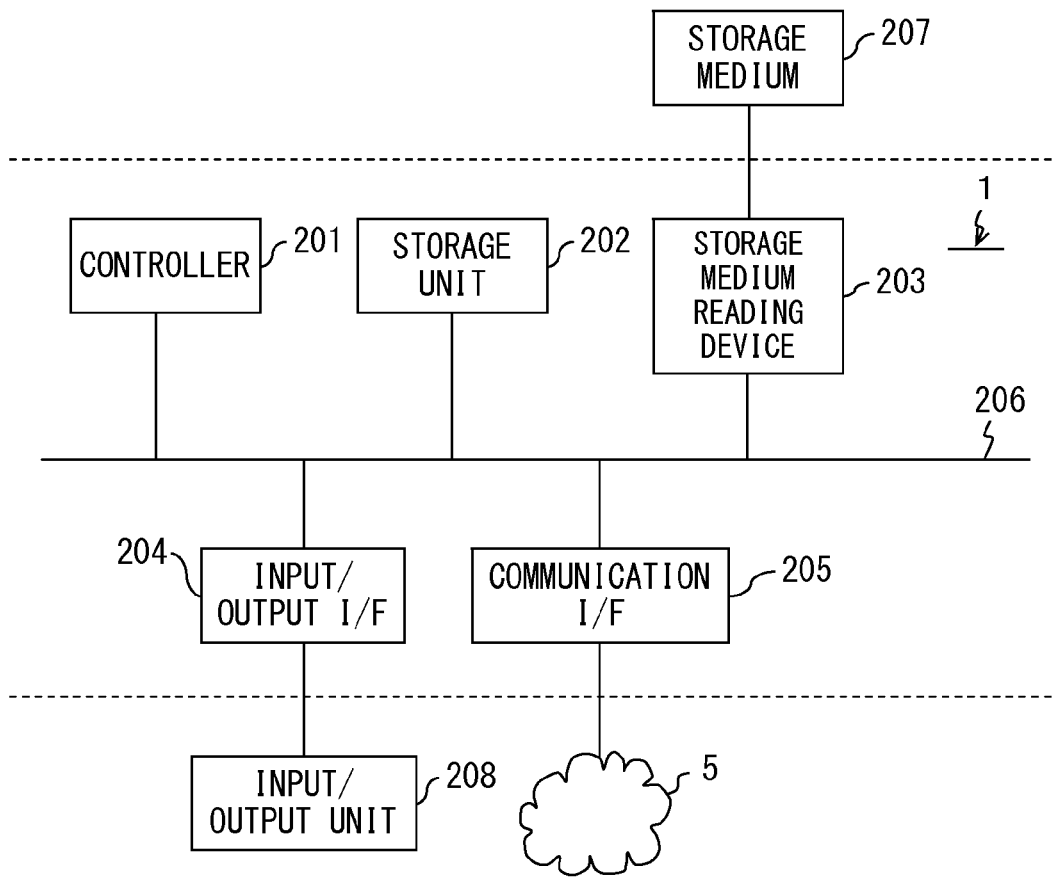
F I G. 2

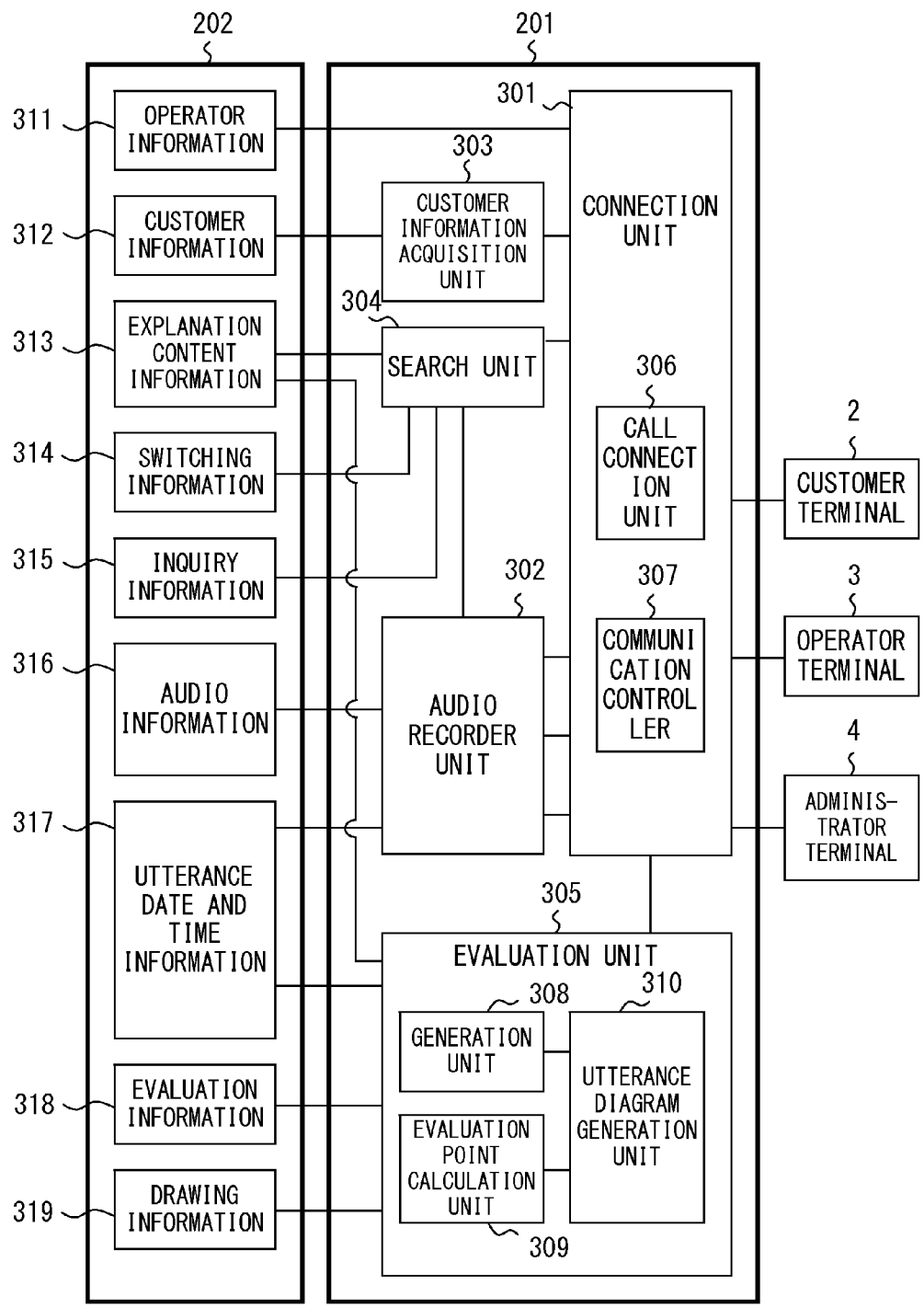
F I G. 3

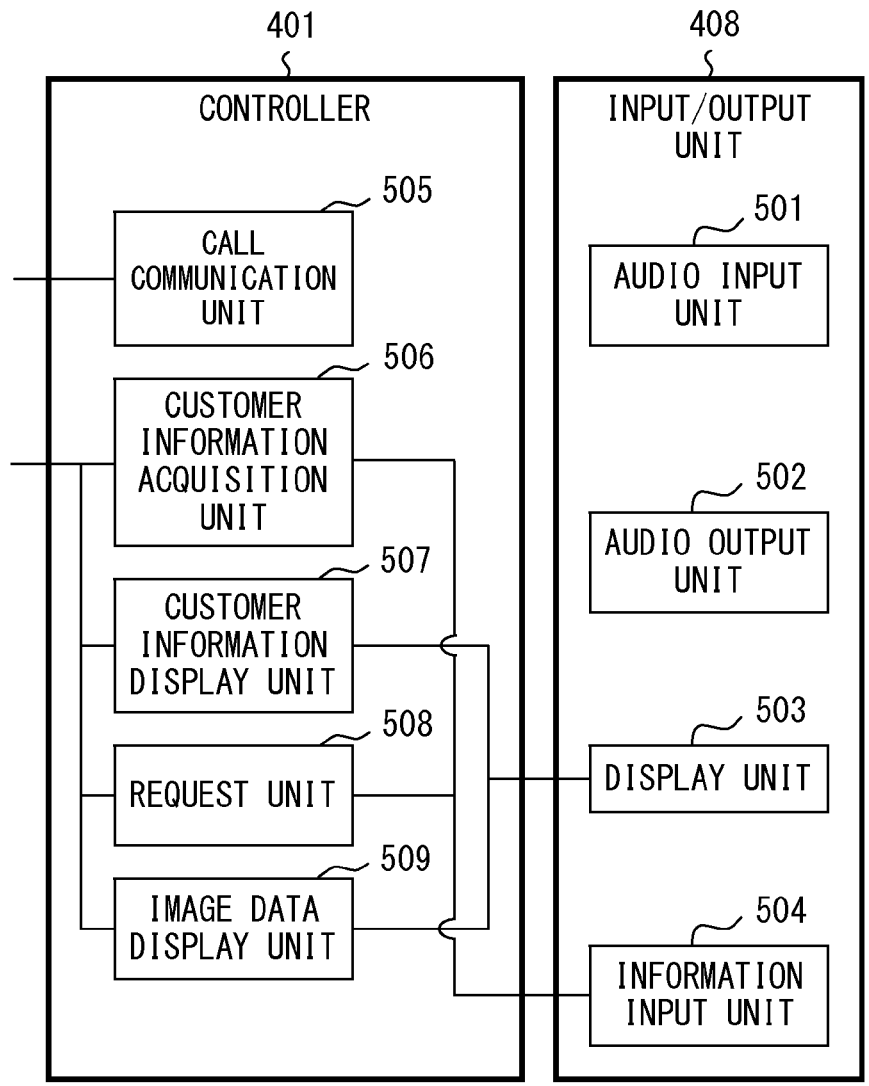
F I G. 5

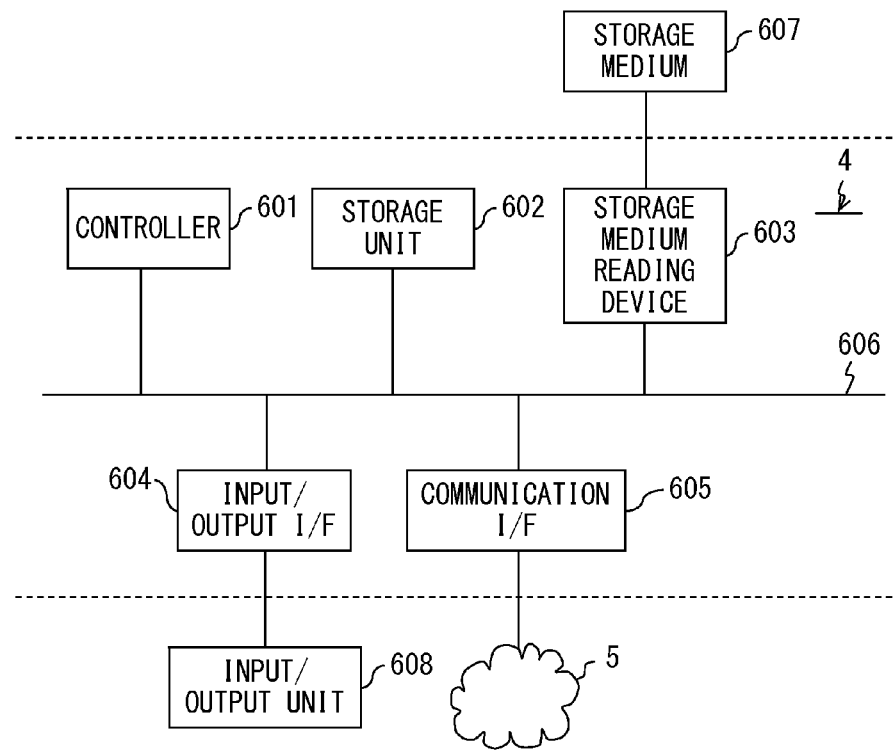
F I G. 6

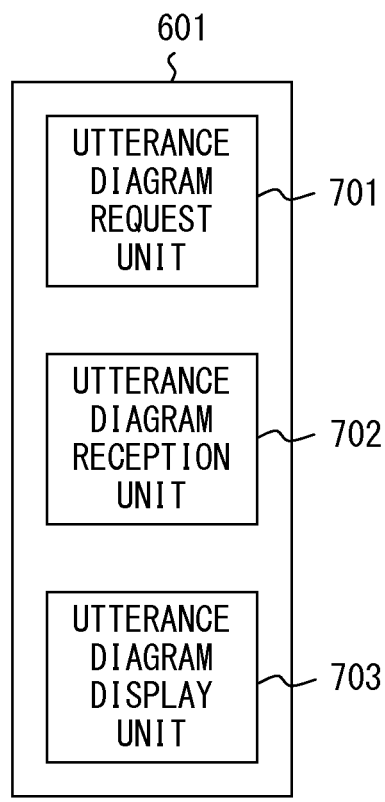
F I G. 7

| OPERATOR ID | CALLING STATUS | NAME |
|---|---|---|
| 2000 | 1 | ○○ |
| 2010 | 0 | ×× |
| 2020 | 1 | △△ |
| 2030 | 0 | ◇◇ |
| ...... | ...... | ...... |

| CUSTOMER ID | TELEPHONE NUMBER | NAME | ADDRESS | PURCHASED PRODUCT MODEL NUMBER | PLACE OF PURCHASE |
|---|---|---|---|---|---|
| 986569 | 044-○○○ | ○○ | ○○○○ | XJ78359 | TAMA BRANCH |
| 8645525 | 03-××× | ×× | ×××× | CY0976 | SHIBUYA BRANCH |
| 4237647 | 045-△△△ | △△ | △△△△ | KJ98746 | YOKOHAMA BRANCH |
| 376495 | 03-◇◇◇ | ◇◇ | ◇◇◇◇ | KK076554 | NERIMA BRANCH |
| ...... | ...... | ...... | ...... | ...... | ...... |

1001

| PURCHASED PRODUCT MODEL NUMBER | MANUAL ID | SECTION NO. | IMAGE DATA | QUESTION AND ANSWER NUMBER THRESHOLD | UTTERANCE TIME THRESHOLD |
|---|---|---|---|---|---|
| ...... | ...... | ...... | ...... | ...... | ...... |
| XJ78359 | XJ001 | 1 | xj01.pdf | 3 | 20 |
| | | 2 | xj02.pdf | 1 | 20 |
| | | 3 | xj03.pdf | 2 | 25 |
| | ...... | ...... | ...... | ...... | ...... |
| CY0976 | CY001 | 1 | cy01.pdf | 4 | 60 |
| | | 2 | cy02.pdf | 4 | 60 |
| | | 3 | cy03.pdf | 2 | 20 |
| ...... | ...... | ...... | ...... | ...... | ...... |

| CALL ID | SWITCHING DATE AND TIME | MANUAL ID | SECTION NO. |
|---|---|---|---|
| 7840128 | 2010/8/31:10:00:20 | XJ001 | 3 |
| 7840128 | 2010/8/31:10:01:19 | XJ001 | 4 |
| 7840128 | 2010/8/31:10:02:25 | — | — |
| ...... | ...... | ...... | ...... |

| CALL ID | START DATE AND TIME | CUSTOMER ID | OPERATOR ID | AUDIO FILE | INQUIRY NOTE |
|---|---|---|---|---|---|
| 7840128 | 2010/8/31:10:00:20 | 986569 | 2000 | 10080110232000.wav | INQUIRY ABOUT POWER OF IRON VS SERIES. POWER DOES NOT TURN ON. |
| 7840129 | 2010/9/1:16:34:01 | 8645525 | 2010 | 10090116342010.wav | PLURAL BRIGHT SPOTS ON LIQUID CRYSTAL SCREEN OF TV GF SERIES |
| ...... | ...... | ...... | ...... | ...... | ...... |

FIG. 11B

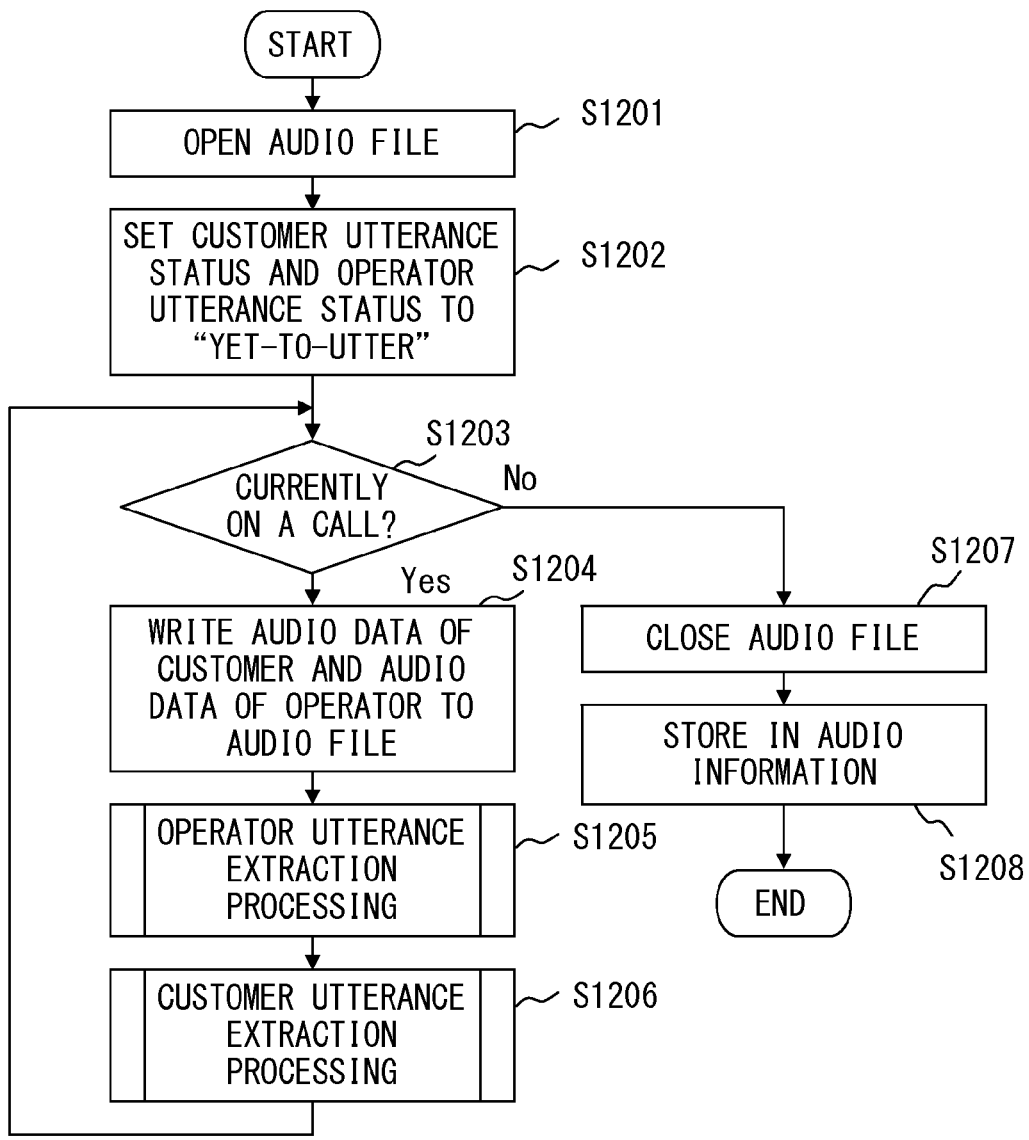
F I G. 1 2

FIG. 13

| CALL ID | AUDIO FILE NAME | LEFT CHANNEL SPEAKER | RIGHT CHANNEL SPEAKER |
|---|---|---|---|
| 7840128 | 10080110232000.wav | OPERATOR | CUSTOMER |
| 7840129 | 10090116342010.wav | OPERATOR | CUSTOMER |
| 7840130 | 10090317321009.wav | OPERATOR | CUSTOMER |
| 7840131 | 10090312343000.wav | OPERATOR | CUSTOMER |
| .... | .... | .... | .... |

1301

| CALL ID | SPEAKER | UTTERANCE START DATE AND TIME | UTTERANCE END DATE AND TIME | MANUAL ID | SECTION NO. |
|---|---|---|---|---|---|
| 7840128 | OPERATOR | 2010/8/31:10:00:00 | 2010/8/31:10:00:10 | - | - |
| 7840128 | CUSTOMER | 2010/8/31:10:00:17 | 2010/8/31:10:00:19 | - | - |
| 7840128 | OPERATOR | 2010/8/31:10:00:21 | 2010/8/31:10:00:29 | XJ001 | 3 |
| 7840128 | CUSTOMER | 2010/8/31:10:00:29 | 2010/8/31:10:00:33 | XJ001 | 3 |
| 7840128 | OPERATOR | 2010/8/31:10:00:34 | 2010/8/31:10:00:45 | XJ001 | 3 |
| 7840128 | CUSTOMER | 2010/8/31:10:00:45 | 2010/8/31:10:00:47 | XJ001 | 3 |
| 7840128 | OPERATOR | 2010/8/31:10:00:48 | 2010/8/31:10:01:10 | XJ001 | 3 |
| 7840128 | CUSTOMER | 2010/8/31:10:01:11 | 2010/8/31:10:01:18 | XJ001 | 4 |
| 7840128 | OPERATOR | 2010/8/31:10:01:20 | 2010/8/31:10:02:16 | XJ001 | 4 |
| 7840128 | CUSTOMER | 2010/8/31:10:02:18 | 2010/8/31:10:02:24 | XJ001 | 4 |
| 7840128 | OPERATOR | 2010/8/31:10:02:26 | 2010/8/31:10:02:35 | - | - |
| 7840128 | CUSTOMER | 2010/8/31:10:02:36 | 2010/8/31:10:02:40 | - | - |
| .... | .... | .... | .... | .... | .... |

1501

F I G. 15

| MANUAL ID | SECTION NO. | QUESTION AND ANSWER NUMBER THRESHOLD | UTTERANCE TIME THRESHOLD | QUESTION AND ANSWER NUMBER | CUSTOMER UTTERANCE TIME | OPERATOR UTTERANCE TIME | EXCESS FLAG |
|---|---|---|---|---|---|---|---|
| — | — | — | — | — | — | — | |
| XJ001 | 3 | 2 | 25 | 1 | 2 | 10 | |
| XJ001 | 3 | 2 | 25 | 1 | 4 | 8 | |
| XJ001 | 3 | 2 | 25 | 2 | 2 | 11 | |
| XJ001 | 4 | 2 | 20 | 3 | 7 | 22 | 1 |
| — | — | — | — | 1 | 6 | 56 | |
| ⋯⋯ | ⋯⋯ | ⋯⋯ | ⋯⋯ | ⋯⋯ | 4 | 9 | ⋯⋯ |

2101

F I G. 21

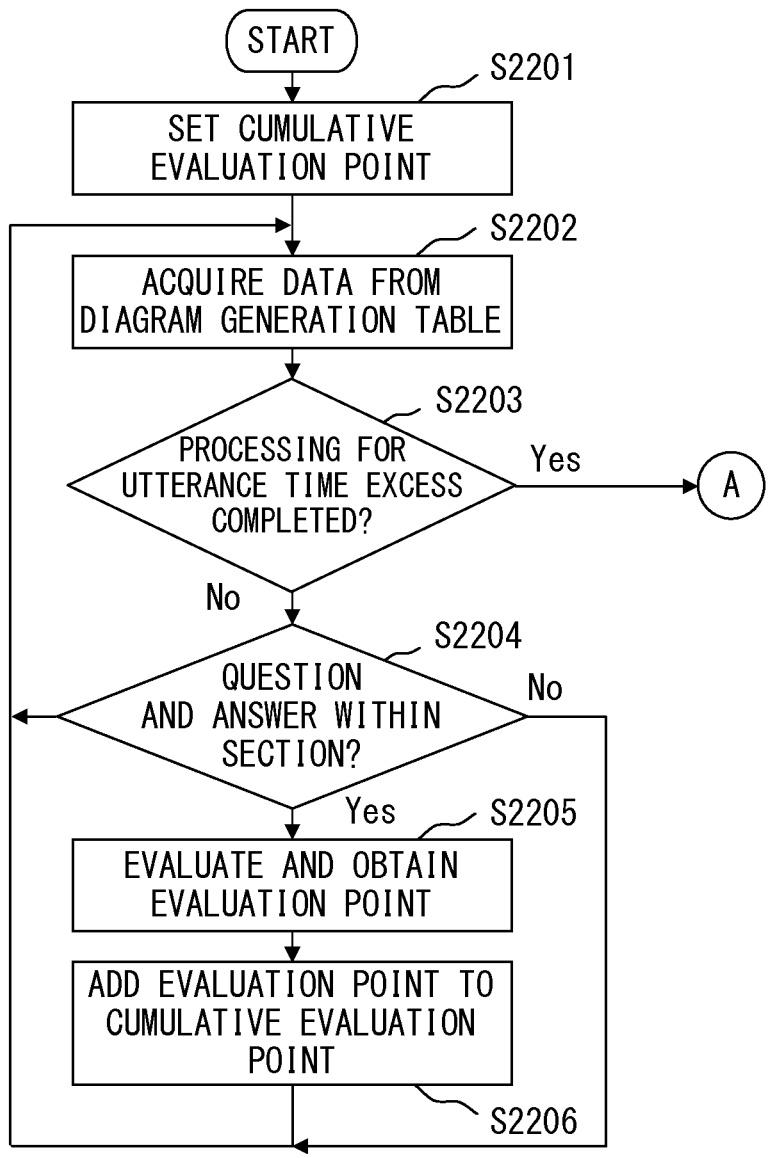
F I G. 22A

FIG. 23

| OVER QUESTION AND ANSWER NUMBER THRESHOLD | EVALUATION POINT 1 | OVER UTTERANCE TIME THRESHOLD | EVALUATION POINT 2 |
|---|---|---|---|
| 1-2 | -10 | 1-3 | -5 |
| 3-5 | -20 | 4-6 | -10 |
| 6-7 | -30 | 7-10 | -15 |
| 8- | -40 | 11- | -20 |

| ITEM | MESSAGE | DISPLAY POSITION | DISPLAY SIZE | DISPLAY COLOR | FONT INFORMATION | ...... |
|---|---|---|---|---|---|---|
| TEMPLATE | message_1 | position_1 | size_1 | color_1 | font_1 | ...... |
| EVALUATION POINT NAME | message_2 | position_2 | size_2 | color_2 | font_2 | ...... |
| NUMBER OF TIMES OF EXCEEDING QUESTION AND ANSWER NUMBER THRESHOLD | message_3 | position_3 | size_3 | color_3 | font_3 | ...... |
| NUMBER OF TIMES OF EXCEEDING UTTERANCE TIME THRESHOLD | message_4 | position_4 | size_4 | color_4 | font_4 | ...... |
| OPERATOR UTTERANCE TIME 1 | message_5 | position_5 | size_5 | color_5 | font_5 | ...... |
| OPERATOR UTTERANCE TIME 2 | — | position_6 | size_6 | color_6 | font_6 | ...... |
| | — | position_7 | size_7 | color_7 | font_7 | ...... |
| ...... | | | | | | ...... |

CALL EVALUATION DEVICE AND CALL EVALUATION METHOD

CROSS-REFERENCE TO RELATED APPLICATION

This application is a continuation application of International Application PCT/JP2011/056662 filed on Mar. 18, 2011 and designated the U.S., the entire contents of which are incorporated herein by reference.

FIELD

The present invention relates to a call evaluation device and a call evaluation method to evaluate call situations.

BACKGROUND

Improvement in accuracy of evaluating the customer service of operators in a call center, etc., has been sought in recent years. Conventionally, evaluation of situations of customer service of operators has been made by listening to the call between the customer and the operator later and by evaluating the operator's response to the customer. For that reason, at the time of evaluating an administrator and an operator are not able to quickly determine if there is a problem in the customer service of operators.

For example, a technology to evaluate a call of an operator in a call center by using utterances of the operator and a customer has been known. In this technology, technologies in which audio input from an operator or a customer undergoes audio processing (power or utterance section and silent section) and the processed audio is output, and a warning is issued as a result of a comparison with a certain threshold, have been known. For example, when it is determined that the operator's utterances include too many particular expressions such as interjections or too little explanatory vocabulary, or is too loud, too quiet, or too fast, or when it is determined that a ratio of one speaker's utterances to another speaker's silence is large, a warning is issued.

Moreover, a technology to compare a ratio of utterances between an operator and a customer and to determine whether or not the ratio of utterances is biased by using audio information of an operator and a customer in a prescribed period of time during a call has been known. When the ratio is determined to be biased, an administrator who is in charge of the operator or the operator receives the warning against improper customer service of the operator. Furthermore, a technology that obtains an utterance ratio between an operator and a customer and displays the utterance ratio on a terminal of an administrator in a chronological order has been known.

In addition, a technology to evaluate the content of answers of an operator so as to provide quick and accurate answers to a customer's questions has been known. According to this technology, an evaluation value is obtained on the basis of a predetermined evaluation formula by using the speed of an operator from receiving a question to an output of an answer e-mail to a customer or the length of the answer provided in the answer e-mail, and an evaluation is made on the basis of the evaluation value.

It has also been known that by storing questions from customers in the past and an operator's answers to the questions in association with customer's evaluations of the answers, when a similar question is received, an operator who is highly evaluated for the answer to the question is assigned.

Furthermore, a technology to graphically display an order of uttering in a remote conference system has been known. According to this technology, utterance sections for each speaker are displayed in a chronological order by analyzing overlapping or continuity of utterance sections by using audio information for each speaker.

Patent Document 1: Japanese Laid-Open Patent Publication No. 2007-33754
Patent Document 2: Japanese Laid-Open Patent Publication No. 2009-216840
Patent Document 3: Japanese Laid-Open Patent Publication No. 2001-297259
Patent Document 4: Japanese Laid-Open Patent Publication No. 2004-157733
Patent Document 5: Japanese Laid-Open Patent Publication No. 2007-58767

SUMMARY

A certain an aspect of the present embodiments discussed herein is related to a call evaluation device that provided with a storage unit, an audio recording unit, and an evaluation unit.

The storage unit stores audio information of a call performed by using a first terminal that a first speaker uses and a second terminal that a second speaker uses, an utterance for each of the first speaker and the second speaker being associated with a date and time or an elapsed time from a start of the call. The storage unit also stores screen identification information to identify screen information displayed on the second terminal, and display history information in which the screen identification information of the screen information displayed on the second terminal is associated with a date and time or an elapsed time, from a start of the call, at which the screen is displayed.

The audio recording unit associates the utterance for each of the first speaker and the second speaker with the screen information by using the date and time or the elapsed time from the start of the call associated with the utterance for each of the first speaker and the second speaker in the audio information, the date and time or the elapsed time, from the start of the call, at which the screen information is displayed, and the screen identification information of the displayed screen information.

The evaluation unit calculates a question and answer number for the screen information by defining a combination of an utterance of the first speaker and an utterance of the second speaker, which are associated with the same screen information, as a question and answer. Moreover, the evaluation unit obtains an utterance time of the second speaker for each question and answer, and generates display information that causes an output device to display the question and answer number for the screen information and the utterance time of the second speaker for each question and answer. A transmission unit transmits the generated display information to the output device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating an embodiment of the system to support a telephone call;

FIG. 2 is a diagram illustrating an embodiment of hardware of the call evaluation device;

FIG. 3 is a diagram illustrating an embodiment of the functions of the controller and the storage unit;

FIG. 5 is a block diagram illustrating a relationship between the controller and the input/output unit of the operator terminal;

FIG. 6 is a diagram illustrating an embodiment of hardware of the administrator terminal;

FIG. 7 is a diagram illustrating an embodiment of the controller of the administrator terminal;

FIGS. 9A and 9B are a diagram illustrating an embodiment of a data structure of operator information and customer information;

FIG. 10 is a diagram illustrating an embodiment of the data structure of the explanation content information;

FIGS. 11A and 11B are a diagram illustrating an embodiment of a data structure of the switching information;

FIG. 12 is a flowchart illustrating an embodiment of operations in the audio recorder unit;

FIG. 13 is a diagram illustrating an embodiment of a data structure of the audio information;

FIG. 15 is a diagram illustrating an embodiment of a data structure of the utterance date and time information;

FIG. 21 is a diagram illustrating an embodiment of the data structure of the diagram generating table;

FIGS. 22A and 22B are a flowchart illustrating an embodiment of operations in the evaluation point calculation processing;

FIG. 23 is a diagram illustrating an embodiment of a data structure of the evaluation information;

FIG. 26 is a diagram illustrating an embodiment of a data structure of the drawing information.

DESCRIPTION OF EMBODIMENTS

Figure 4:
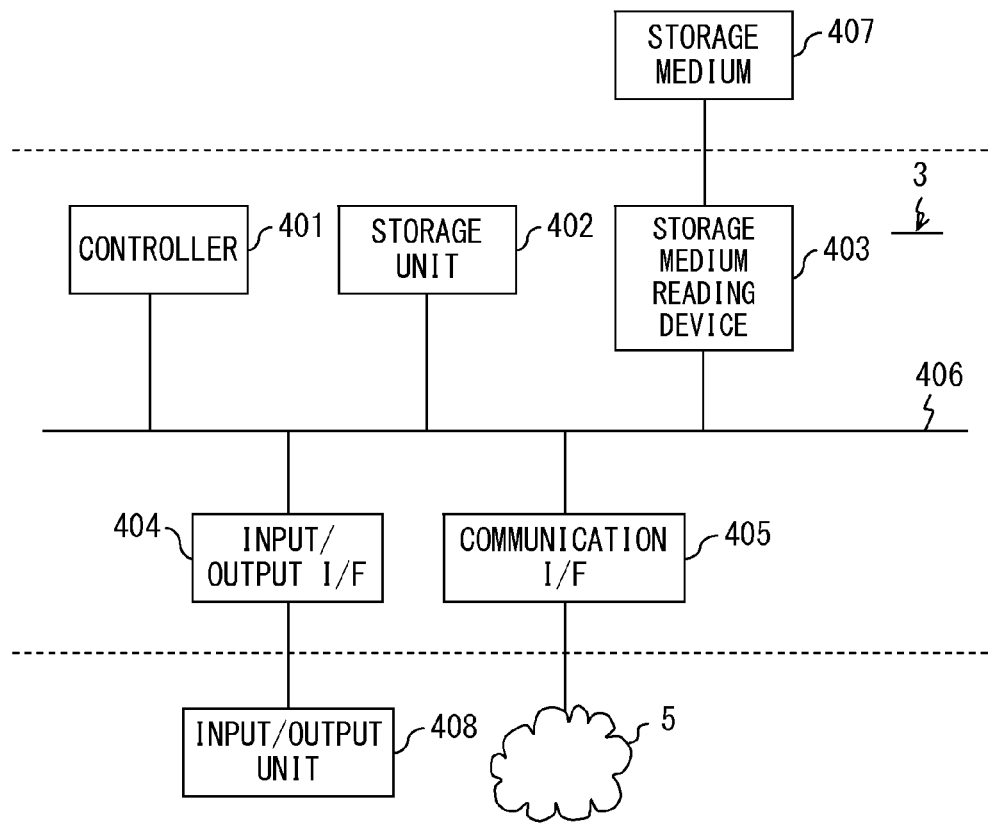
FIG. 4 is a diagram illustrating an embodiment of hardware of the operator terminal.

When an operator provides customer services, it is desirable for the operator to move on to the next question at the same time as confirming whether or not the customer understands the operator's answer, in order to give precise explanations to the customer. It is also desirable that a question-and-answer time, which is a time from a question from a customer to an answer by the operator to the question, not be long. More specifically, a long question-and-answer time is considered to be due to a long answering time of the operator or a long questioning time of the customer because the customer does not understand the answer to the question. In addition, if an answer is unclear, a customer may frequently ask more questions, and consequently the number of the questions and answers would be expected to be increased.

However, in determining whether or not an operator has given a precise answer to a customer's question, it is not possible to precisely evaluate customer service by checking the operator's utterance time alone. In other words, for identical total utterance times for an operator for example, there are two possible cases: a case in which the operator utters for a long time and a case in which the operator stops uttering at proper timings and seeks the customer's approval. Of these cases, the latter case is obviously preferable. However, such a difference would not be determined only from a ratio of the total times.

Similarly, it is also difficult to precisely evaluate customer service by checking only the number of times an operator utters. Even for identical total utterance times for an operator, there are also two possible cases as examples: a case in which the operator utters for a long time in the first half and exchanges many short questions and answers in the second half, and a case in which the operator stops uttering every time at a proper length and encourages the customer to speak. Of these cases also, the latter is obviously preferable. However, such a difference would not be determined only from the number of times an operator utters in a certain time period.

Furthermore, the expected number of questions and answers and the expected utterance time will be different in accordance with a content of the questions and answers. Therefore it is necessary to identify the content of the questions and answers between the operator and the customer. It is possible to identify the content of questions and answers by audio recognition processing; however, a simpler identification method without audio recognition processing processes or without generating costs such as a price of the audio recognition processing has been sought.

In Embodiment 1, each of explanation screens (e.g., each page of a manual) displayed on the screen of an operator terminal at the time of customer service of an operator is associated with the number of times the questions and answers exchanged between a customer and the operator and the utterance time of each question and answer, and is displayed on a screen of an administrator terminal. As a result, because an administrator such as a supervisor who is in charge of operators refers to the content displayed on the screen and will be able to evaluate whether or not there are problems in the actual services of an operator to a customer, the accuracy in evaluation relating to an operator's customer service can be improved. In addition, by referring to the contents displayed on the screen without playing audio files, which had been performed conventionally, evaluation can be made immediately. Furthermore, by displaying the reference values for the number of questions and answers and operator's utterance time for a single question and answer for each explanation screen, the administrator can give specific advise to the operators.

It should be noted that when an operator gives an explanation to a customer, since it is desirable for the operator to go on to the next question at the same time as confirming with the customer, it is desirable that the customer utters once after the operator utters once. Therefore; a preferable question and answer is, for example, that the customer utters once after the operator utters once, and that these utterances be paired as one question and answer. In other words, the number of times an operator utters is considered to be the same as the number of time a customer utters during an explanation using an explanation screen.

In the following descriptions, details of embodiments are explained with reference to the drawings.

FIG. 1 is a diagram illustrating an embodiment of the system to support a telephone call. The system illustrated in FIG. 1 has a call evaluation device 1 (server), a customer terminal 2 (first terminal), an operator terminal 3 (second terminal), and an administrator terminal (third terminal). The call evaluation device 1 and the customer terminal 2 are connected to a network 5 such as the Internet, a public line and a dedicated line. The call evaluation device 1, the operator terminal 3 and the administrator terminal 4 are connected in a call center, for example, via a network. Alternatively, the call evaluation device 1 provided separately from the call center may be connected to the operator terminal 3 and the administrator terminal 4 in the call center, for example, via the network 5. The customer terminal 2 may include, for example, a telephone set, an Internet Protocol (IP) telephone set, and a softphone that a customer uses. The operator terminal 3 and the administrator terminal 4 are explained later.

The call evaluation device 1 is explained.

FIG. 2 is a diagram illustrating an embodiment of hardware of the call evaluation device. The call evaluation device 1 is provided with a controller 201, a storage unit 202, a storage medium reading device 203, an input/output interface 204 (input/output I/F), and a communication interface 205 (communication I/F). Each of the above components are connected with one another by a bus 206.

The call evaluation device 1 may be realized by using a server, etc. The controller 201 includes components such as a connection unit 301, an audio recorder unit 302, a customer information acquisition unit 303, a search unit 304, and an evaluation unit 305, which are described later. For the controller 201, a Central Processing Unit (CPU), a multi-core CPU, a programmable device (Field Programmable Gate Array (FPGA), Programmable Logic Device (PLD) etc.) may be used.

The storage unit 202 stores information such as operator information 311, customer information 312, explanation content information 313, switching information 314, inquiry information 315, audio information 316, utterance date and time information 317, evaluation information 318, and drawing information 319, which are described later. Note that the storage unit 202 may record data such as parameter values and variable values, or may be used as a work area at the time of execution. It should also be noted that the operator information 311, the customer information 312, the explanation content information 313, the switching information 314, the inquiry information 315, the audio information 316, the utterance date and time information 317, the evaluation information 318, and the drawing information 319, etc., may be recorded in a database serving as hardware.

The storage medium reading device 203 controls data read/write of a storage medium 207 in accordance with the control of the controller 201, causes the storage medium 207 to record data written by the control of the storage medium reading device 203, and causes the storage medium 207 to read the recorded data. A removable storage medium 207 includes a magnetic recording device, an optical device, a magneto-optical medium, and a semiconductor memory as a non-transitory computer-readable storage medium. The magnetic recording device includes a hard disk device (HDD), etc. An optical disk includes Digital Versatile Disc (DVD), DVD-RAM, Compact Disc Read Only Memory (CD-ROM), CD-R (Recordable)/RW (ReWritable), etc. The magneto-optical medium includes a magneto-optical disk (MO), etc. Note that the storage unit 202 is also included in a non-transitory storage medium.

The input/output interface 204 is connected with an input/output unit 208, receives information input by a user, and transmits the information to the controller 201 via the bus 206. In addition, the input/output interface 204 displays information such as operation information on a screen of a display in accordance with a command from the controller 201. An input device of the input/output unit 208 may be a keyboard, a pointing device (such as a mouse), or a touch panel, as an example. Note that the display, which is an output unit of the input/output unit 208, may be a liquid crystal display as an example. The output unit may be output devices such as a Cathode Ray Tube (CRT) display and a printer.

The communication interface 205 is an interface for a Local Area Network (LAN) connection, an Internet connection, or a wireless connection between the customer terminal 2 and the operator terminal 3. The communication interface 205 is an interface for the LAN connection, the Internet connection, or the wireless connection with other computers, when necessary. In addition, the communication interface 205 is connected to other devices and controls an input/output of data to/from external devices.

Various processing functions, which are described later, are realized by using a computer with such a hardware configuration. In such a case, a program to which are written contents of processing of functions that the system should have is provided. By executing the program with a computer, the above processing functions are realized on the computer. The program to which the contents of processing are written can be stored in the computer-readable storage medium 207.

When a program is distributed, the storage medium 207 such as DVD and CD-ROM that records the program is sold, for example. Additionally, the program is recorded in a storage device of a server computer and is transferred to other computers from the server computer via a network.

A computer executing the program stores the program recorded in the storage medium 207 or the program transferred from the server computer in its own storage unit 202. The computer reads the program from its own storage unit 202 and executes processing in accordance with the program. Note that the computer can read the program directly from the storage medium 207 and executes the processing in accordance with the program. The computer can execute the processing sequentially for every transfer of the program from the server computer in accordance with the sequentially received program.

The controller 201 and the storage unit 202 are explained.

FIG. 3 is a diagram illustrating an embodiment of the functions of the controller and the storage unit. The controller 201 in FIG. 3 includes components such as a connection unit 301, an audio recorder unit 302, a customer information acquisition unit 303, a search unit 304, and an evaluation unit 305.

A call connection unit 306 of the connection unit 301, when receiving a call from the customer terminal 2, for example, searches for operator information 311, which is described later, and extracts an operator who is not currently on a call. For example, with reference to an identifier indicating whether or not an operator is currently on a call, an operator who is not currently on a call is extracted. When an operator who is not currently on a call is extracted, the call connection unit 306 connects an extracted operator terminal 3 to the customer terminal 2 from which the call is received to enable both parties to be on a call together. Afterwards, the connection unit 301 gives the audio recorder unit 302 an instruction of a notice to start recording the call to the audio recorder unit 302. When completion of the call between the extracted operator terminal 3 and the customer terminal 2 is detected, the connection unit 301 terminates the call and records an identifier, which indicates that the operator is not currently on a call, in the operator information 311.

The audio recorder unit 302, when it receives the instruction of the notice to start recording from the connection unit 301, records audio of the customer and the audio of the operator in audio information 316, which is described later. The audio recorder unit 302 also records all that the operator and the customer utters in association with a date and time or an elapsed time from the start of the call.

The customer information acquisition unit 303 acquires customer identification information to identify a customer, which an operator had heard from the customer, from the operator terminal 3 via the connection unit 301 of the call evaluation device 1. The customer information acquisition unit 303 acquires information of a customer who matches the acquired customer identification information.

The search unit 304 retrieves a manual, which is requested by an operator and is used for the service to a customer, and image data (image information) corresponding to pages of the manual. The search unit 304 also records a date and time at which a request to switch the page of the manual is received. The search unit 304 records an outline of the call.

The evaluation unit 305 associates the number of times of the question and answer between the customer and the operator and utterance time for each question and answer with each of the explanation screens displayed on the screen of the operator terminal at the time of customer service of the operator, and generates utterance diagram data (display information) to display on the screen of the administrator terminal. The evaluation unit 305 transmits the utterance diagram data to the administrator terminal 4 via the connection unit 301.

The storage unit 202 in FIG. 3 stores information such as operator information 311, customer information 312, explanation content information 313, switching information 314, audio information 316, utterance date and time information 317, inquiry information 315, and evaluation information 318. Note that the operator information 311, the customer information 312, the explanation content information 313, the switching information 314, the audio information 316, the utterance date and time information 317, the inquiry information 315, and the evaluation information 318 are described later.

The operator terminal 3 is explained.

FIG. 4 is a diagram illustrating an embodiment of hardware of the operator terminal. A personal computer (PC) may be used for the operator terminal 3. The operator terminal 3 includes components such as a controller 401, a storage unit 402, a storage medium reading device 403, an input/output interface 404 (input/output I/F), and a communication interface 405 (communication I/F). Each of the above components is connected with one another by a bus 406. For the controller 401, a Central Processing Unit (CPU), a programmable device (Field Programmable Gate Array (FPGA), Programmable Logic Device (PLD) etc.) may be used. The controller 401 controls each component in the operator terminal 3. The controller 401 also includes components illustrated in FIG. 5 such as a call communication unit 505, a customer information acquisition unit 506, a customer information display unit 507, a requester unit 508, and an image data display unit 509. FIG. 5 is a block diagram illustrating a relationship between the controller and the input/output unit of the operator terminal. The call communication unit 505 communicates with the call connection unit 306 in the call evaluation device 1 and controls the communication with the customer terminal 2. The customer information acquisition unit 506 transmits to the call evaluation device 1 customer information, which is information of a customer acquired by the operator and input from an information input unit 504 (e.g., a keyboard), by using an audio input unit 501 and an audio output unit 502 (e.g., handset), which are illustrated in FIG. 5. The customer information display unit 507 acquires information relating to the customer information transmitted from the call evaluation device 1 and causes a display unit 503 (e.g., a display) to display. The requestor unit 508 generates a request notice to obtain from the call evaluation device 1 explanation contents that an operator needs for explanation. For example, the explanation is given by using page 3 of the manual, the target manual and page number are input from the information input unit 504, and a request notice including the target manual and page number is generated and transmitted to the call evaluation device 1. The image data display unit 509 receives image data of the manual and page corresponding to the request notice from the call evaluation device 1 and causes the display unit 503 (e.g., a display) to display.

For the storage unit 402, memories such as Read Only Memory (ROM) and Random Access Memory (RAM) and hard disks may be used. Note that the storage unit 402 may record data such as parameter values and variable values, or may be used as a work area at the time of execution.

The storage medium reading device 403 controls the storage medium 407 to read/write data in accordance with the control of the controller 401. The storage medium reading device 403 causes the storage medium 407 to store data written by the control of the storage medium reading device 403, and reads data stored in the storage medium 407. The removable storage medium 407 includes a magnetic recording device, an optical device, a magneto-optical medium, and a semiconductor memory as a non-transitory computer-readable storage medium. The magnetic recording device includes a hard disk device (HDD) etc. An optical disk includes a Digital Versatile Disc (DVD), DVD-RAM, Compact Disc Read Only Memory (CD-ROM), CD-R(Recordable)/RW(ReWritable), etc. The magneto-optical medium includes a magneto-optical disk (MO), etc. Note that the storage unit 402 is also included in a non-transitory storage medium.

The input/output interface 404 is connected with the input/output unit 408, receives information input by a user, and transmits the information to the controller 401 via the bus 406. In addition, the input/output interface 404 displays information such as operation information on the screen of a display in accordance with a command from the controller 401. An input device of the input/output unit 408 may be a keyboard, a pointing device (such as a mouse), or a touch panel, as an example. Note that the display, which is an output unit of the input/output unit 408, may be a liquid crystal display, as an example. The output unit may be output devices such as a Cathode Ray Tube (CRT) display and a printer. The input/output unit 408 includes, for example, an audio input unit 501, an audio output unit 502, a display unit 503, and an information input unit 504, which are illustrated in FIG. 5. The audio input unit 501 acquires an audio of an operator and inputs the audio to the operator terminal 3. Examples include microphones, etc. The audio output unit 502 outputs an audio of a customer, which is transmitted from the customer terminal 2. Examples include headphones and speakers, etc. Note that the audio input unit 501 and the audio output unit 502 may be a headset.

The communication interface 405 is an interface for a Local Area Network (LAN) connection, an Internet connection, or a wireless connection between the call evaluation device 1 and the customer terminal 2. The communication interface 405 is an interface for the LAN connection, the Internet connection, or the wireless connection with other computers, when necessary. In addition, the communication interface 405 is connected to other devices and controls input/output of data from/to external devices.

The administrator terminal 4 is explained.

FIG. 6 is a diagram illustrating an embodiment of hardware of the administrator terminal. A personal computer (PC) may be used for the administrator terminal 4. The administrator terminal 4 includes components such as a controller 601, a storage unit 602, a storage medium reading device 603, an input/output interface 604 (input/output I/F), and a communication interface 605 (communication I/F). Each of the above components is connected with the others by a bus 606. For the controller 601, a Central Processing Unit (CPU), a programmable device (Field Programmable Gate Array (FPGA), Programmable Logic Device (PLD) etc.) may be used. The controller 601 controls each component in the administrator terminal 4, and includes an utterance diagram request unit 701, an utterance diagram reception unit 702, and an utterance diagram display unit 703. FIG. 7 is a diagram illustrating an embodiment of the controller of the administrator terminal. The utterance diagram request unit 701 generates an utterance diagram display request notice to request to create an utterance diagram indicating an evaluation result of an operator, when the operators are evaluated with the call evaluation device 1. The utterance diagram display request notice is transmitted to the call evaluation device 1 via the communication interface 605. The utterance diagram reception unit 702 receives utterance diagram data, which is described later, transmitted from the call evaluation device 1 and transfers it to the utterance diagram display unit 703. The utterance diagram display unit 703 outputs the evaluation of the operator to the output unit of the input/output unit 608 by using the utterance diagram data.

For the storage unit 602, memories such as Read Only Memory (ROM) and Random Access Memory (RAM) and hard disks may be used. Note that the storage unit 602 may record data such as parameter values and variable values, or may be used as a work area at the time of execution.

The storage medium reading device 603 controls the storage medium 607 to read/write data in accordance with the control of the controller 601. The storage medium reading device 603 causes the storage medium 607 to store data written by the control of the storage medium reading device 603, and reads data stored in the storage medium 607. The removable storage medium 607 includes a magnetic recording device, an optical device, a magneto-optical medium, and a semiconductor memory as a non-transitory computer-readable storage medium. The magnetic recording device includes a hard disk device (HDD), etc. An optical disk includes Digital Versatile Disc (DVD), DVD-RAM, Compact Disc Read Only Memory (CD-ROM), CD-R (Recordable)/RW (ReWritable) etc. The magneto-optical medium includes magneto-optical disk (MO), etc. Note that the storage unit 602 is also included in a non-transitory storage medium.

The input/output interface 604 is connected with the input/output unit 608, receives information input by a user, and transmits the information to the controller 601 via the bus 606. In addition, the input/output interface 604 displays information such as operation information on the screen of a display in accordance with a command from the controller 601. An input device of the input/output unit 608 may be a keyboard, a pointing device (such as a mouse), or a touch panel, as an example. Note that the display, which is an output unit of the input/output unit 608, may be a liquid crystal display, as an example. The output unit may be output devices such as a Cathode Ray Tube (CRT) display and a printer.

The communication interface 605 is an interface for a Local Area Network (LAN) connection, an Internet connection, or a wireless connection between the call evaluation device 1 and the operator terminal 3. The communication interface 605 is an interface for the LAN connection, the Internet connection, or the wireless connection with other computers, when necessary. In addition, the communication interface 405 is connected to other devices and controls input/output of data from/to external devices.

Operations of the call evaluation device are explained.

In order to evaluate a call of an operator, firstly, spoken words of the operator and a customer, who are on a call together, and a page of a manual that the operator used during the call, which is displayed on the input/output unit 408 of the operator terminal 3, are associated with one another and are stored in the storage unit 202.

Figure 8A:
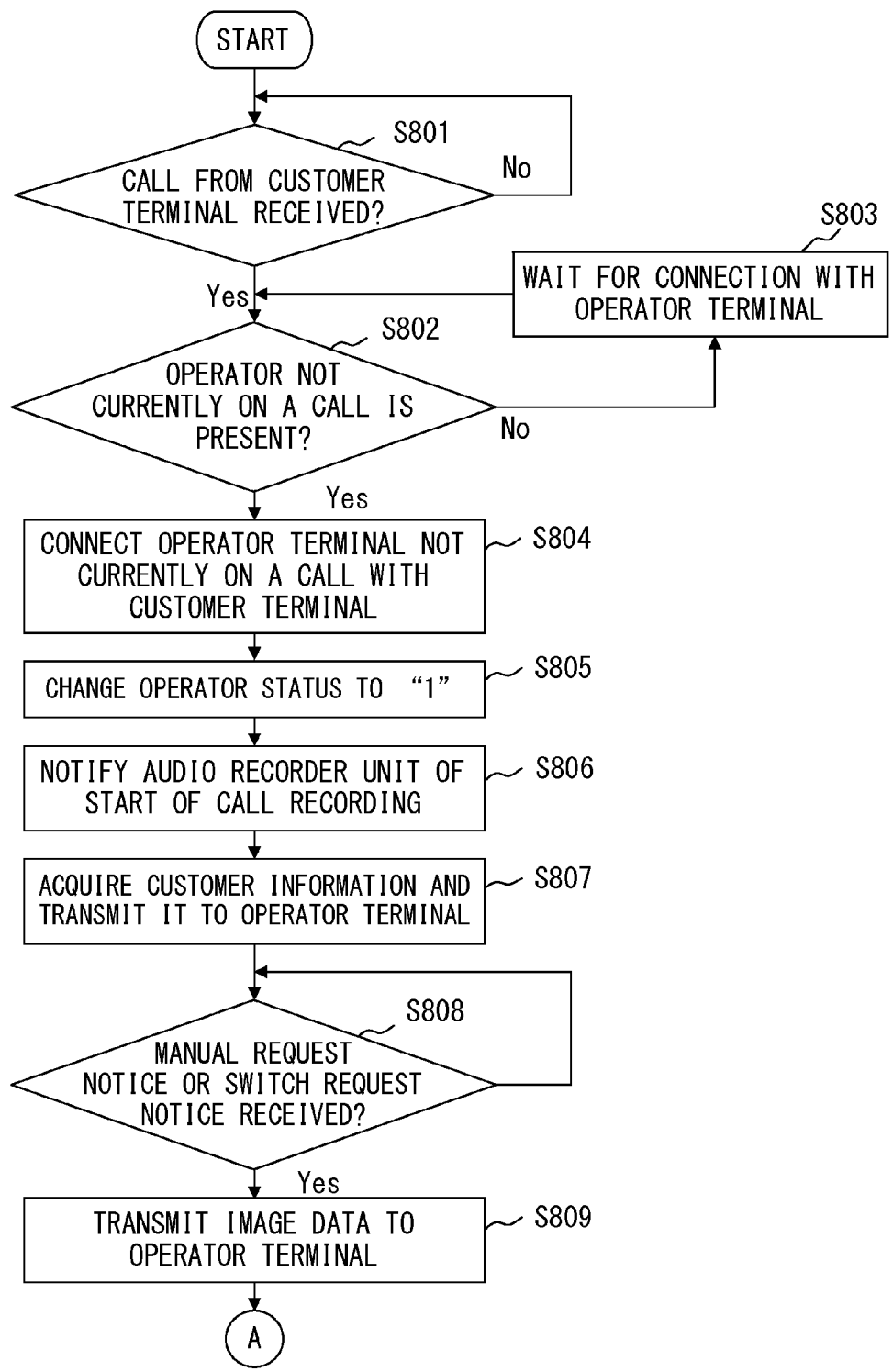
FIGS. 8A and 8B are a flowchart illustrating an embodiment of operations in the connection unit.
Figure 8B:
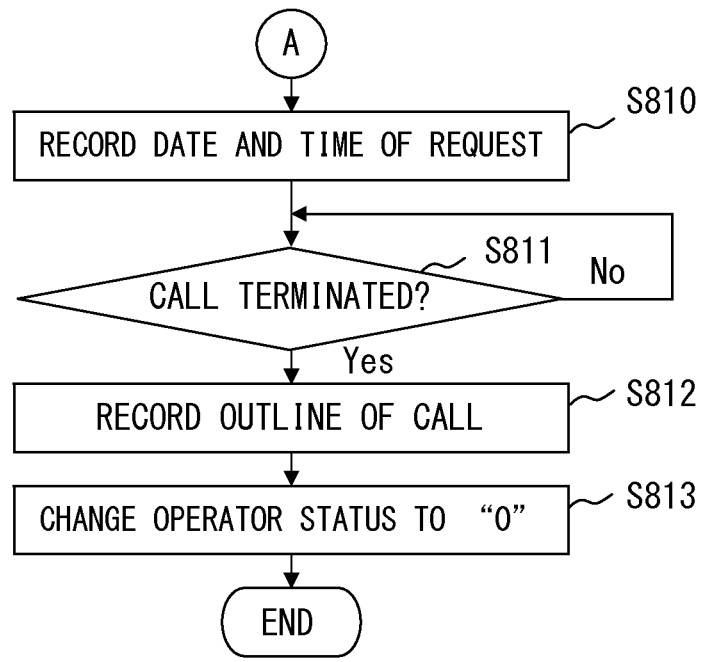

FIGS. 8A and 8B are a flowchart illustrating an embodiment of operations in the connection unit. In step S801, the call connection unit 306 of the connection unit 301 receives a call transmitted from the customer terminal 2.

When the reception of the call is detected, in step S802, the call connection unit 306 searches in the operator information 311 to detect whether or not an operator who is not currently on a call is present. The operator information is information indicating whether or not operator terminals 3 that operators use are connected to customer terminals 2.

The operator information 311 is explained.

FIGS. 9A and 9B are a diagram illustrating an embodiment of a data structure of operator information and customer information. The operator information 901 illustrated in FIG. 9A includes "operator ID", "calling status", and "name". "Operator ID" records an identifier to identify the operator terminal 3 that an operator is currently using. In this example, "2000", "2010", "2020", "2030", . . . are recorded as the identifiers of operator terminals. "Calling status" records an identifier to identify whether or not an operator terminal 3 and a customer terminal 2 are currently connected and on a call with one another. In this example, either an identifier "1" denoting that the operator terminal is connected or an identifier "0" denoting that the operator terminal is not connected and is available is associated with the identifier of the operator terminal and is recorded. "Name" records an identifier to identify an operator. In this example, "OO", "xx", "ΔΔ", and "◇◇" . . . are recorded as the names of operators.

Next, when the call connection unit 306 detects an available operator terminal 3 in step S802, the processing moves on to step S804 (Yes). When the call connection unit 306 is not able to detect an available operator terminal 3, the processing moves on to step S803 (No).

In step S803, a connection with the customer terminal 2 from which the call is received would not be made until the call connection unit 306 detects an available operator terminal 3 in the operator information.

In step S804, the call connection unit 306 connects the customer terminal 2, which is not connected, and the operator terminal 3. In the operator information 901 in FIG. 9A, operators corresponding to operator terminal identifiers "2010" and "2030" are available, and therefore either one of the operator terminals 3 and the customer terminal 2 from which the call is received can be connected to each other.

In step S805, a communication controller 307 of the connection unit 301 changes the status of the operator in the operator information to an identifier indicating that the operator is currently on a call. In the operator information 901 (311)

in FIG. 9A, when the operator terminal 3 is connected to the customer terminal 2, the identifier "0" denoting that the operator is available is changed to the identifier "1" denoting that the operator is currently on a call. At that time, information to identify a call is assigned to the call. The information to identify a call is, for example, a number such as "7840128" added as "call ID".

In step S806, the communication controller 307 notifies the audio recorder unit 302 of information indicating the start of call recording included in a recording notice. The audio recorder unit 302 records audio of the operator and the audio of the customer independently from the connection unit 301 when the recording notice indicating the start of recording is received.

In step S807, the customer information acquisition unit 303 acquires the customer identification information, which an operator had heard from the customer to identify a customer, and is input by using the input/output unit 401 connected to the operator terminal 3, from the operator terminal 3 via the connection unit 301 of the call evaluation device 1. Next, in step S807, the customer information acquisition unit 303 acquires information of a customer who matches the acquired customer identification information with reference to the customer information 312. The acquired information of a customer may be a customer ID to identify the customer, telephone number, name, and address of the customer, a model number of the purchased product, and a place that the product is purchased.

The customer information 312 is explained. For example, the customer information 902 stored in the storage unit 202 in FIG. 9B includes "customer ID", "telephone number", "name", "address", "purchased product model number", and "place of purchase". In the "customer ID", information to identify a customer is recorded. In this example, "986569", "8645525", "4237647", "376495" . . . are recorded as the customer ID. In the "telephone number", a telephone number of the customer is recorded. In this example, "044-ooo", "03-xxx", "045-ΔΔΔ", "03-◇◇◇" . . . are recorded as the telephone number. In "name", a name of the customer is recorded. In this example, "oo", "xx", "ΔΔ", "◇◇" . . . are recorded as the name of the customer. In "address", an address of the customer is recorded. In this example, "oooo", "xxxx", "ΔΔΔΔ", "◇◇◇◇" . . . are recorded as the address of the customer. In "purchased product model number", the model number of the product that the customer purchased is recorded. In this example, "XJ78359", "CY0976", "KJ98746", "KK076554" . . . are recorded as the model number of purchased product. In "place of purchase", a name of the store at which the customer purchased the product is recorded. In this example, "Tama branch", "Shibuya branch", "Yokohama branch", "Nerima branch" . . . are recorded as the place of purchase.

For example, when the call evaluation device 1 acquires from the operator terminal 3 customer identification information including the customer ID "986569", the telephone number "044-ooo", the name "oo", and the address "oooo", the information that is associated with "986569" becomes the information of the customer. In this example, the customer ID "986569", the telephone number "044-oooo", the name "oo", the address "oooo", the purchased product model number "XJ78359", and the place of purchase "Tama branch" are the information of the customer.

Next, in step S807, the customer information acquisition unit 303 transmits the above information of the customer to the operator terminal 3 via the connection unit 301.

When the operator terminal 3 receives the above information of the customer, the information of the customer is displayed on a display screen of the input/output unit 408 connected to the operator terminal 3. For example, the customer ID "986569", the telephone number "044-ooo", the name "oo", the address "oooo", the purchased product model number "XJ78359", and the place of purchase "Tama branch" are displayed. However, the customer will not always make an inquiry about the purchased product model number, "XJ78359", which has been registered. In a case of a different product, the product that the customer actually inquired about and that the operator inputs is the product for which the purchased product model number is input. When the purchased product model number is unknown, a product category (e.g., iron, etc.) or a name of series of products (e.g., XJ series, CY series etc.) is input.

When the operator complete the inputs about the product, the operator terminal 3 transmits a manual request notice including information relating to the product to the call evaluation device 1 to request a manual for the product for which the operator is receiving a question from the customer. In other words, the operator requests a manual of the product to use it to answer the question from the customer. The information relating to the product is a purchased product model number, but it may be a product category or a name of a series of products, if the purchased product model number is not clear.

When the operator requests a shift from a screen currently displayed on the input/output unit 408 of the operator terminal 3 to a different screen while being on a call with the customer about the product while referencing the manual, a switch request notice is transmitted from the operator terminal 3. The switch request notice includes, for example, information to designate a page in the manual to be displayed.

In step S808, the search unit 304 determines whether or not a manual request notice or a switch request notice is received, and when a request is received, the processing moves on to step S809, and when a request is not received, the processing moves on to step S808.

In step S809, the search unit 304 refers to the explanation content information 313, and acquires image data that matches information included in the manual request notice or the switch request notice.

The explanation content information 313 is explained. FIG. 10 is a diagram illustrating an embodiment of the data structure of the explanation content information. The explanation content information 1001 in FIG. 10 includes "purchased product model number", "manual ID", "section No.", "image data", "question and answer number threshold", "utterance time threshold", etc. In "purchased product model number", a model number of the purchased product, a product category, or a name of series of products is recorded. In this example, . . . "XJ78359", "CY0976" . . . are recorded as the model number of the purchased product. In "manual ID", information to identify a manual corresponding to the "purchased product model number" is recorded. A manual is image data and includes information such as an explanation of the product, an operation method, answers to questions relating to troubles, and answers to general questions. In this example, . . . "XJ001", "CY001" . . . are recorded as the manual ID. In "section No", pages of each manual corresponding to the "manual ID" are recorded. In this example, "1", "2", "3", . . . are recorded in association with "XJ001" and "1", "2", "3", . . . are recorded in association with "CY001". Note that although pages are associated with the "section No.", the pages are further divided, for example, and identifiers corresponding to the explanation of the product, each operation method, each of the answers to questions relating to troubles, and each of the answers to general questions may be recorded.

It should be noted that the manual ID and the section No. are information (screen identification information) to identify each piece of image data (screen information), which correspond to the screen displayed on the operator terminal 3.

Image data corresponding to "section No." is recorded in the "image data". In this example, image data, "xj01.pdf", "xj02.pdf", and "xj03.pdf" are recorded in association with "1", "2", and "3" of "XJ001", respectively. In addition, image data, "cy01.pdf", "cy02.pdf", "cy03.pdf" . . . are recorded in association with "1", "2", "3", . . . of "CY001". Note that the image data is not limited to pdf (Portable Document Format), but image data in other formats can be used. The number of questions and answers to be a reference for each explanation screen is recorded in "question and answer threshold". For example, the question and answer threshold may be an average value of the number of questions and answers between customers and operators of the explanation screen used in calls in the past. An administrator may set the threshold in advance. In other words, it is desirable for the question and answer threshold to be a value that allows for a relative evaluation of an operator's service to a customer. In this example, . . . "3", "1", "2", . . . "4", "4", "2", . . . are recorded as question and answer thresholds. An operator's utterance time per one question and answer is recorded in "utterance time threshold" to be a reference for each expiation screen. For example, the utterance time threshold may be an average value of an operator's utterance time of the explanation screen used in calls in the past, or an administrator may set the threshold in advance. In other words, it is desirable for the utterance time threshold to be a value that allows for a relative evaluation of an operator's service to a customer. In this example, . . . "20", "20", "25", . . . "60", "60", "20", . . . are recorded as utterance time thresholds.

In step S809, a case in which a manual request notice is received is explained.

The search unit 304 acquires information that matches information of products included in the manual request notice (information such as a purchased product model number, a product category, and a name of a series of products) with reference to the explanation content information 313. For example, when "XJ78359" is included in a manual request notice, "XJ001" is acquired as a manual ID.

In step S809, a case in which a switch request notice is received is explained.

The search unit 304 acquires information that matches information to designate a page to be displayed of a manual included in the switch request notice with reference to the explanation content information 313. For example, when a manual ID "XJ001" is selected and "1" is included in the switch request notice, image data "xj01.pdx", which corresponds to the section No. "1" (page number in this example) of the manual ID "XJ001", is acquired.

Next, in step S809, the search unit 304 transmits the information including the image data associated with the manual ID and the section No. to the operator terminal 3 via the connection unit 301.

It should be noted that in this example, a manual request notice and a switch request notice are separated, but a manual request and a switch request may be reported together.

It is desirable to display a table of contents that associates an explanation of the product, an operation method, answers to questions relating to troubles, and answers to general questions, all of which are recorded in the manual, on page 1, which is the section No. "1". In other words, because wherein the manual an explanation corresponding to a question of a customer is found is not clear in a manual request notice to be received immediately after starting a call, a table of contents is provided so that the explanation corresponding to the question can be found immediately.

In step S810, a date and time at which the search unit 304 received a manual request notice and a switch request notice, or a date and time at which the search unit 304 switched pages of the manual, or an elapsed time from the start of the call to the switching is recorded in the switching information 314 (display history information). In the switching information (display history information), image identification information of the screen information displayed on the operator terminal 3 is associated with a date and time the screen is displayed or time elapsed from the start of the call.

FIGS. 11A and 11B are a diagram illustrating an embodiment of a data structure of the switching information. The switching information 1101 in FIG. 11A includes "call ID", "switching date and time", "manual ID", and "section No.". Information to identify a call is recorded in "call ID". In this example, "7840128" is recorded as information to identify a call. In the "switching date and time", date and time at which a manual request notice or a switch request notice was received, or an elapsed time from the start of the call to the switching is recorded as the data and time at which the display of the input/output unit 408 of the operator terminal 3 was switched. In this example, "2010/8/31:10:00:20", "2010/8/31:10:01:19", "2010/8/31:10:02:25" . . . are recorded as switch date and time. In "manual ID", information to identify a manual in association with the switch date and time is recorded. In this example, "XJ001", "-" . . . are recorded as the manual ID. In "section No.", pages of each manual corresponding to "manual ID" are recorded. In this example, "3", "4", "-" . . . are recorded in association with the switch date and time and the manual ID. Note that "-" denotes non-display.

In step S811, the call connection unit 306 detects whether or not the call between the customer terminal 2 and the operator terminal 3 has been terminated. When the termination of the call is detected, the processing moves on to step S812 (Yes), and when the call is continued, the processing moves on to step S811 (No).

In step S812, the search unit 304 records an outline of the call in inquiry information 315. Inquiry information 1102 in FIG. 11B includes, for example, "call ID", "start date and time", "customer ID", "operator ID", "audio file", and "inquiry note". Information to identify a call is recorded in "call ID". In this example, "7840128", "8000019", . . . are recorded as information to identify calls. The date and time the call started or an elapsed time from the start of the call is recorded in the "start date and time" in association with the call ID. In this example, "2010/8/31:10:00:20", "2010/9/1: 16:34:01" . . . are recorded as the call start date and time. Information to identify a customer is recorded in the "customer ID" in association with the call ID. In this example, "986569", "8645525" . . . are recorded as the customer ID. Information to identify an operator is recorded in the "operator ID" in association with the call ID. In this example, "2000", "2010" . . . are recorded as the operator ID. Titles of audio files in which calls are recorded are recorded in "audio file" in association with the call IDs. In addition, storage sites of the audio files are recorded in association with this audio data. In this example, "10080110232000.wav", "10090116342010.wav" . . . are recorded as the titles of audio files. A brief note of an operator about the call is recorded in the "inquiry note". In this example, notes such as "INQUIRY ABOUT POWER OF IRON VS SERIES. POWER DOES NOT TURN ON", "PLURAL BRIGHT SPOTS ON LIQUID CRYSTAL SCREEN OF TV GF SERIES" . . . are recorded.

When termination of the call between the customer terminal 2 and the operator terminal 3 is detected, in step S813, the communication controller 307 of the connection unit 301 changes the status of the operator terminal 3 in the operator information to an identifier indicating that the operator is currently available. In the operator information 901 in FIG. 9A, the identifier "1" indicating that the operator terminal 3 is currently on a call is changed to the identifier "0" indicating the operator terminal 3 is currently available. The connection unit 301 also transmits to the audio recorder unit 302 a recording notice including information indicating termination of the call.

The audio recorder unit is explained.

FIG. 12 is a flowchart illustrating an embodiment of operations in the audio recorder unit. In step S1201, when the audio recorder unit 302 receives a record start notice transmitted from the connection unit 301, the audio recorder unit 302 opens an audio file to record audio of the customer and the audio of the operator. Audio data recorded in for example a wave format or in an MP3 format is recorded in the audio file.

In step S1202, the audio recorder unit 302 records in the storage unit 202 that the customer and the operator currently on a call have not spoken yet. For example, a customer utterance storage region and an operator utterance storage region are temporarily secured in the storage unit 202 to store "yet-to-utter", indicating both the customer and the operator have yet-to-utter when the customer and the operator have not spoken yet and to store "uttering" when the customer and the operator are uttering. Here, the customer and the operator have not spoken yet shortly after the connection and therefore "yet-to-utter" is stored in each of the customer utterance storage region and the operator utterance storage region. Note that whether or not the customer and the operator have spoken is described later.

In step S1203, the audio recorder unit 302 determines whether or not the customer and the operator are currently on a call, and the processing moves on to step S1204 (Yes) when the customer and the operator are currently on a call, or the processing moves on to step S1207 (No) when the call is terminated. For example, a recording notice including information indicating that the call has been terminated is acquired from the connection unit 301, and the processing moves on to step S1207.

In step S1204, the audio recorder unit 302 acquires the audio data of the customer and the audio data of the operator in a determined time period via the connection unit 301 and writes the data to an audio file. For example, the audio data and the audio data and the operator are written to an audio file every 20 milliseconds. However, the writing of the audio data is not limited to every 20 milliseconds.

In step S1206, the audio recorder unit 302 performs customer utterance extraction processing that extracts the customer's utterances, and in step S1205, the audio recorder unit 302 performs operator utterance extraction processing that extracts the operator's utterances. The customer utterance extraction processing and the operator utterance extraction processing are described later.

In step S1207, the audio recorder unit 302 closes the audio file, and in step S1208, the audio recorder unit 302 stores the audio file in the audio information. For example, a recording notice including information indicating termination of the call is acquired from the connection unit 301, and the audio file illustrated in FIG. 13 is closed and is stored in the audio information 316. FIG. 13 is a diagram illustrating an embodiment of a data structure of the audio information.

The audio information 316 illustrated in FIG. 13 includes "call ID", "audio file name", "left channel speaker", and "right channel speaker". The "call ID" is an identifier added to a call between the customer terminal 2 and the operator terminal 3. In this example, "7840128", "7840129", "7840130", "7840131" . . . are recorded as identifiers identifying calls. The title of an audio file generated by the audio recording unit 302 is recorded in the "audio file name" in association with the "call ID". The recording site of the audio file is also recorded in association with this audio data. In this example, "10080110232000.wav", "10090116342010.wav", "10090317321009.wav", "10090312343000.wav" . . . are recorded as titles of the audio files.

Information indicating a channel in which a customer or an operator is recorded is recorded in each of "left channel speaker" and "right channel speaker". In this example, "operator" indicating an operator's utterances is recorded in the left channel, and "customer" indicating a customer's utterances is recorded in the right channel.

The operator utterance extraction processing and the customer utterance extraction processing are explained.

Figure 14:
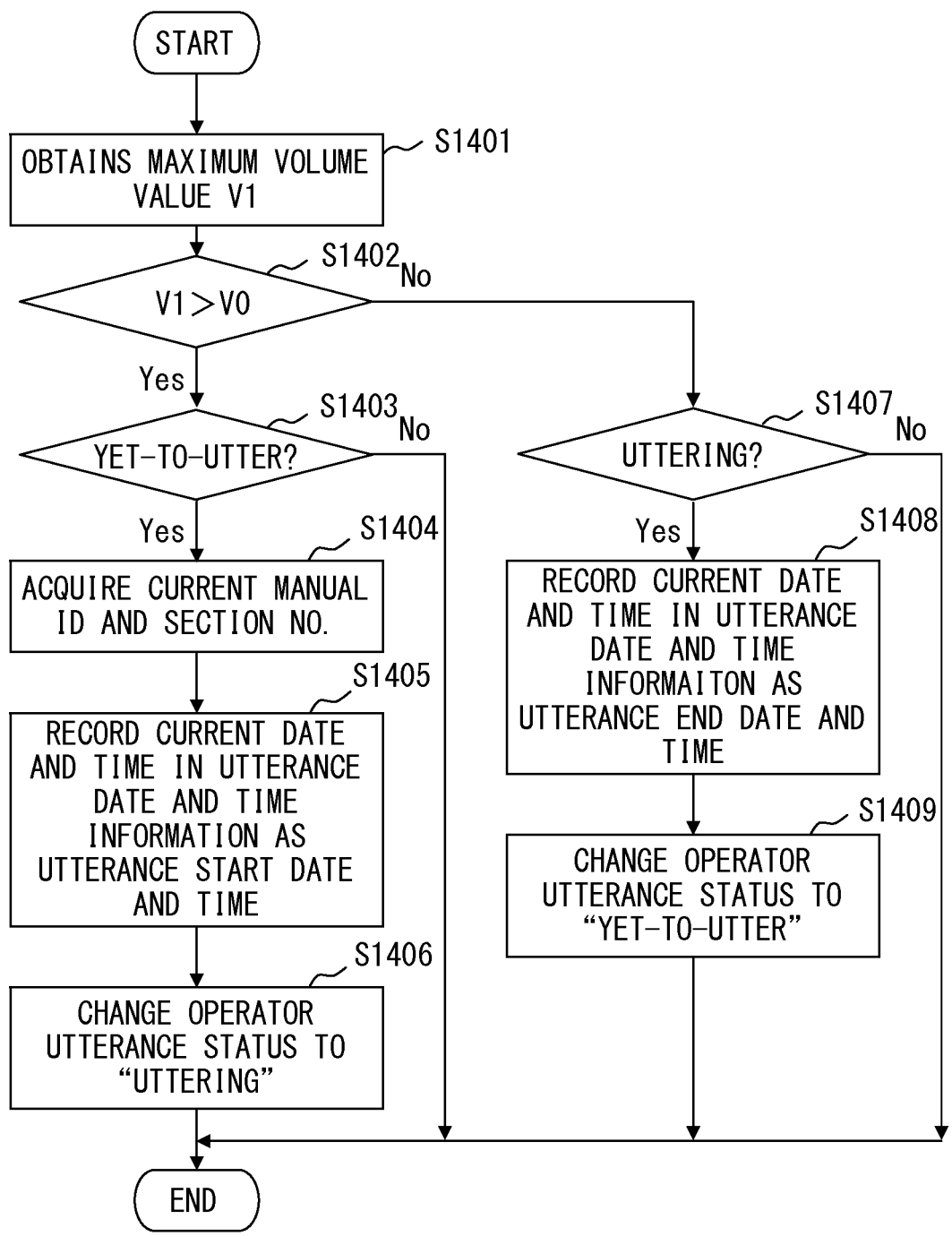
FIG. 14 is a flowchart illustrating an embodiment of operations of the operator utterance extraction processing.
Figure 16:
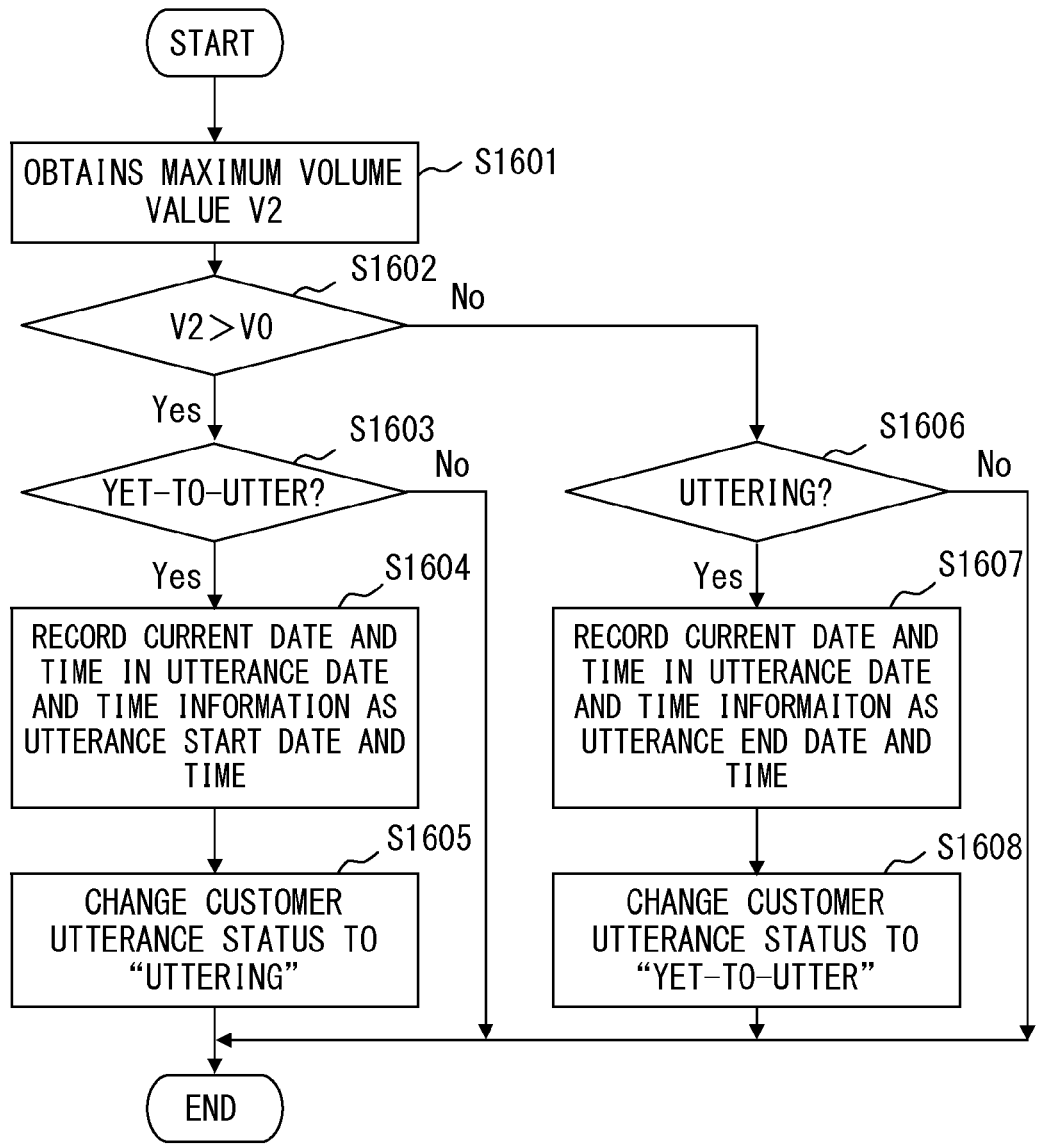
FIG. 16 is a flowchart illustrating an embodiment of operations of the customer utterance extraction processing.

FIG. 14 is a flowchart illustrating an embodiment of operations of the operator utterance extraction processing. FIG. 16 is a diagram illustrating an embodiment of operations of the customer utterance extraction processing.

In step S1401 in FIG. 14, the audio recorder unit 302 obtains a maximum volume value V1 by using the audio data of the operator for a time period acquired for each determined time period. For example, the audio data of the operator for 20 milliseconds is acquired every 20 milliseconds and the maximum volume value V1 is obtained by analyzing data indicating a volume included in the audio data for 20 milliseconds. However, the time period is not limited to 20 milliseconds.

In step S1402, the audio recording unit 302 compares the maximum volume value V1 with a predetermined volume value V0 for every determined period, and determines whether or not V1>V0. When V1>V0, the processing moves on to step S1403 (Yes), when V1≤V0, the processing moves on to step S1407. Here, a silent value V0 is a volume that is considered to be silent. The silent value V0 may be set, for example, by measuring noise at the time at which there is no call and taking an average of the measured values as the silent value V0.

In step S1403, the audio recorder unit 302 determines whether or not the operator and the customer have yet-to-utter by referring to an operator utterance storage region. When the operator and the customer have not spoken yet, the processing moves on to step S1404 (Yes), and when this is not the case, the operator utterance extraction processing is terminated, and the processing moves on to the next customer utterance extraction processing.

In step S1404, the audio recorder unit 302 acquires from the search unit 304 or the switch information 314 the manual ID corresponding to the manual that the operator is currently looking at and the section No. corresponding to the displayed page of the manual.

In step S1405, the audio recorder unit 302 records the current date and time and information indicating that the operator started uttering in the utterance date and time information. For example, the record may be made as illustrated in the utterance date and time information 317 in FIG. 15.

FIG. 15 is a diagram illustrating an embodiment of a data structure of the utterance date and time information. The utterance date and time information 317 includes "call ID", "speaker", "utterance start date and time", "utterance end date and time", "manual ID", and "section No". The "call ID"

is an identifier added to a call between the customer terminal 2 and the operator terminal 3. In this example, "7840128" . . . are recorded as identifiers identifying calls. A speaker who is currently uttering is recorded in the "speaker". In this example, "customer" indicating that a customer is uttering and "operator" indicating that an operator is uttering are recorded. A date and time at which an operator or a customer starts to utters or an elapsed time from the start of the call is recorded in the "utterance start date and time". In this example, "2010/8/31:10:00:00", "2010/8/31:10:00:17" . . . , each indicating year, month, day, and time, are recorded. Date and time at which the operator or the customer ended the call or an elapsed time from the start of the call is recorded in the "utterance end date and time". In this example, "2010/8/31:10:00:10", "2010/8/31:10:00:19" . . . , each indicating year, month, day, and time, are recorded. Information to identify a manual is recorded in "manual ID". In this example, "XJ001", etc. are recorded as the manual ID. In "section No.", pages of each manual corresponding to the "manual ID" are recorded. In this example, "3", "4", etc. are recorded in association with "XJ001".

In step S1406, the audio recorder unit 302 changes an operator utterance status to "uttering". "Yet-to-utter" in the operator utterance storage region is changed into "uttering".

In step S1407, the audio recorder unit 302 determines whether or not the operator is uttering by referring to the operator utterance storage region. When the operator is uttering, the processing moves on to step S1408 (Yes), and when this is not the case, the operator utterance extraction processing is terminated and the processing moves on to the next customer utterance extraction processing.

In step S1408, the audio recorder unit 302 records the current date and time and information indicating that the operator ended the uttering in the utterance date and time information. For example, the record may be made as illustrated in the utterance date and time information 317 in FIG. 15.

In step S1409, the audio recorder unit 302 changes an operator utterance status to "yet-to-utter". "Uttering" in the operator utterance storage region is changed into "yet-to-utter".

FIG. 16 is a flowchart illustrating an embodiment of operations of the customer utterance extraction processing.

In step S1601 in FIG. 16, the audio recorder unit 302 obtains a maximum volume value V2 by using the audio data of the customer for a time period acquired for each determined time period. For example, the audio data of the customer for 20 milliseconds is acquired every 20 milliseconds and the maximum volume value V2 is obtained by analyzing data indicating volume included in the audio data for 20 milliseconds. However, the time period is not limited to 20 milliseconds.

In step S1602, the audio recording unit 302 compares the maximum volume value V2 with a predetermined volume value V0 for every determined period, and determines whether or not V2>V0. When V2>V0, the processing moves on to step S1603, and when V2≤V0, the processing moves on to step S1606. Here, a silent value V0 is a volume that is considered to be silent. The silent value V0 may be set, for example, by measuring noise at the time at which there is no call and taking an average of the measured values as the silent value V0.

In step S1603, the audio recorder unit 302 determines whether or not the operator and the customer have yet-to-utter by referring to a customer utterance storage region. When the operator and the customer have not spoken yet, the processing moves on to step S1604 (Yes), and when this is not the case, the customer utterance extraction processing is terminated, and the processing moves on to step S1203 (No) in FIG. 12.

In step S1604, the audio recorder unit 302 records the current date and time and information indicating that the customer started uttering in the utterance date and time information. For example, a record may be made as illustrated in the utterance date and time information 317 in FIG. 3. The information indicating that the customer started uttering is "customer utterance start".

In step S1605, the audio recorder unit 302 changes an operator utterance status to "uttering". "yet-to-utter" in the customer utterance storage region is changed into "uttering".

In step S1606, the audio recorder unit 302 determines whether or not the customer is uttering by referring to the customer utterance storage region. When the customer is uttering, the processing moves on to step S1607 (Yes), and when the customer is not uttering, the customer utterance extraction processing is terminated and the processing moves on to step S1203 (No) in FIG. 12.

In step S1607, the audio recorder unit 302 records the current date and time and information indicating that the operator finished uttering in the utterance date and time information. For example, a record may be made in "date and time" and "type of event", as illustrated in the utterance date and time information 1501 in FIG. 15.

In step S1608, the audio recorder unit 302 changes the customer utterance status to "yet-to-utter". "uttering" in the customer utterance storage region is changed into "yet-to-utter".

Next, by using a result stored in the storage unit 202 in which utterances of the operator and the customer during the call are associated with pages (explanation contents) of a manual used by the operator during the call, which are displayed on the input/output unit 408 of the operator terminal 3, the call of the operator is evaluated. Because the evaluation of the call of the operator is performed by an administrator, the evaluation of the operator is requested from the administrator terminal 4 to the call evaluation device 1. When the evaluation unit 305 of the call evaluation device 1 performs evaluation, the evaluation unit 305 transmits the evaluation result to the administrator terminal 4.

Figure 17:
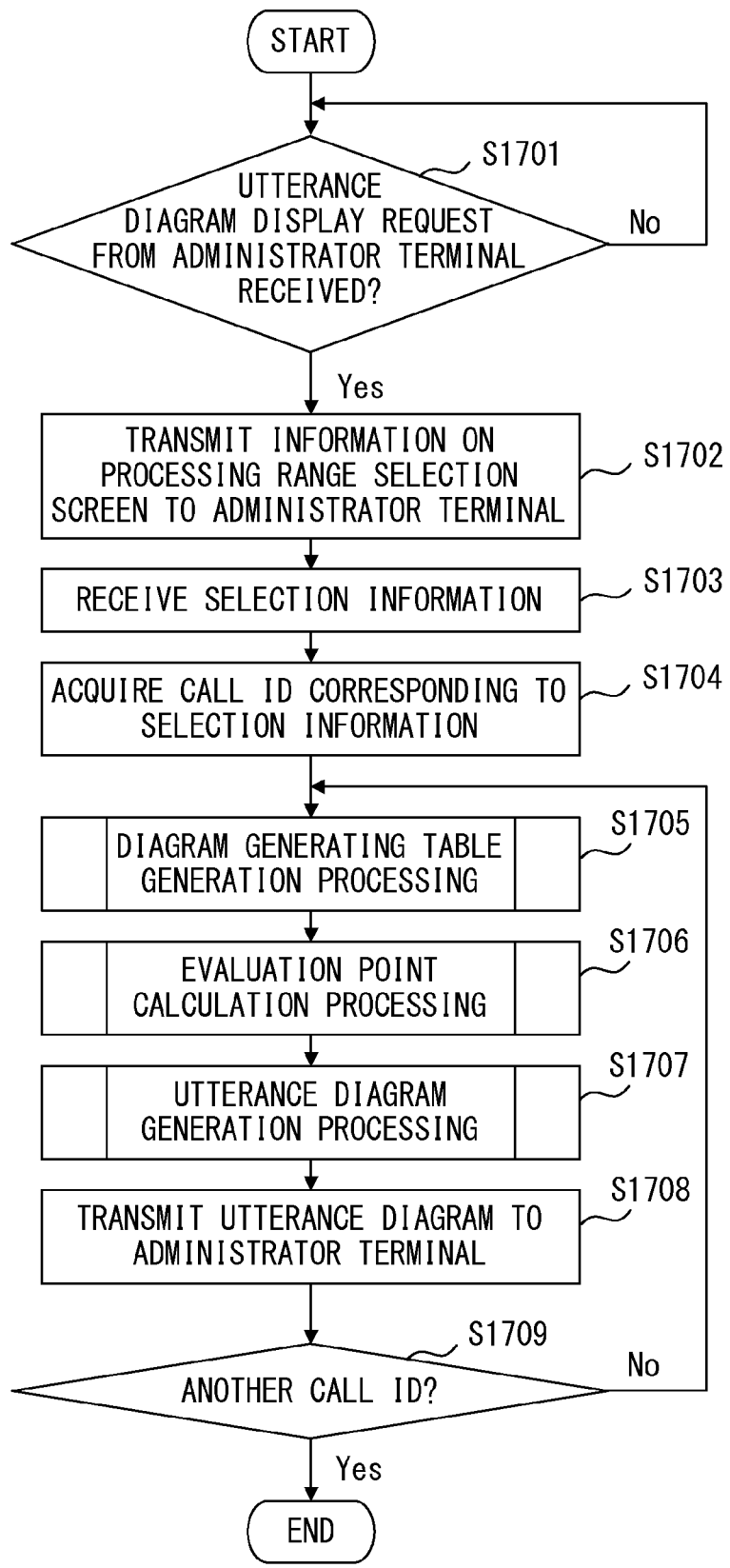
FIG. 17 is a flowchart illustrating an embodiment of operations of the evaluation unit.

FIG. 17 is a flowchart illustrating an embodiment of operations of the evaluation unit. In step S1701, when the evaluation unit 305 receives an utterance diagram display request from the administrator terminal 4 via the connection unit 301, the processing moves on to step S1702 (Yes), and when the utterance diagram display request is not received (No), the evaluation unit waits. Note that the utterance diagram is described later.

In step S1702, the evaluation unit 305 transmits information on a processing range selection screen to the administrator terminal 4 via the connection unit 301.

Figure 18:
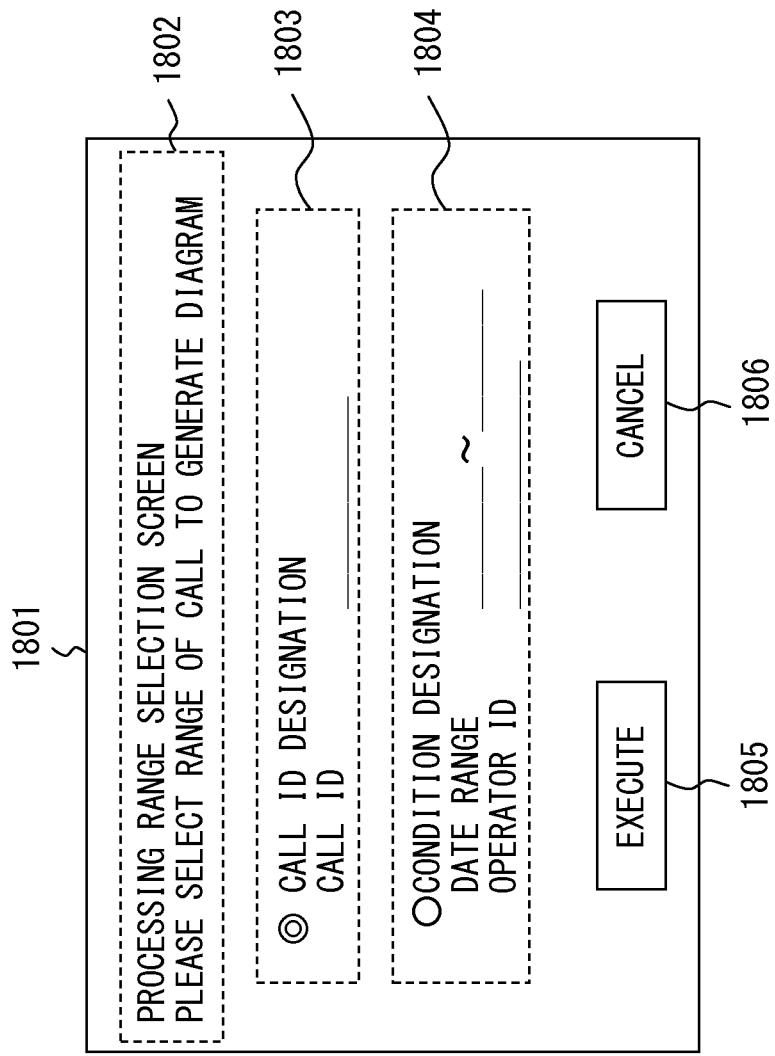
FIG. 18 is a diagram illustrating an embodiment of the processing range selection screen.

FIG. 18 is a diagram illustrating an embodiment of the processing range selection screen. The processing range selection screen is displayed on the input/output unit 608 of the administrator terminal 4, and it may be a processing range selection screen 1801 illustrated in FIG. 18. The processing range selection screen 1801 includes a message area 1802, a call ID designation area 1803, a condition designation area 1804, an execution area 1805, and a cancellation area 1806. The message area 1802 is a message to ask an administrator to input a call ID, a data range, and an operator ID. In this example, "Please select a range of calls for which a list should be generated this time" is displayed on a screen as a message. The call ID designation area 1803 is an area to input the call ID, and the input call ID is stored in the storage unit 602. The condition designation area 1804 is an area to input a date range and an operator ID, and the input date range and operator ID are stored in the storage unit 602. The execution area 1805 is an area to select transmission of the call ID, the date range, and the operator ID, which are stored in the storage unit 602, from the administrator terminal 4 to the call evaluation device 1. The execution area 1805 displayed on the screen may be selected by using a mouse etc. The cancellation area 1806 is an area to select deletion of the call ID, the date range, and the operator ID, which are stored in the storage unit 602. The cancellation area 1806 displayed on the screen may be selected by using a mouse etc.

It should be noted that designs such as arrangement of each area and input methods for the processing range selection screen are not limited to the processing range selection screen 1801 illustrated in FIG. 18, but at minimum may be designs and input methods that allow for transmission of the information on the call ID, the date range, and the operator ID to the call evaluation device 1.

In step S1703, the evaluation unit 305 receives selection information including the call ID, the date range and the operator ID transmitted from the administrator terminal 4 via the connection unit 301.

In step S1704, the evaluation unit 305 acquires a call ID that matches the selection information by referring to the inquiry information 315. When there are plural call IDs in the selection information for example, by using the first call ID recorded in the selection information, a matching call ID is acquired from the inquiry information 315. Note that when there is no matching call ID, information to ask for another input of the call ID is transmitted from the call evaluation device 1 to the administrator terminal 4.

When the selection information does not include a call ID but only an operator ID is included, all call IDs related to the operator ID may be selected by referring to the inquiry information 315. Alternatively, all call IDs related to the operator ID are displayed on the input/output unit 608 of the administrator terminal 4 to have the administrator select a call ID.

When the selection information does not include a call ID, but only a date range is included, all call IDs related to the date range may be selected by referring to the inquiry information 315. Alternatively, all call IDs related to the date range are displayed on the input/output unit 608 of the administrator terminal 4 to have the administrator select a call ID.

In step S1705, the evaluation unit 305 executes a diagram generating table generation processing, which is described later. In step S1706, the evaluation unit 305 executes evaluation point calculation processing. In step S1707, the evaluation unit 305 executes utterance diagram generation processing, which is described later.

In step S1708, the evaluation unit 305 transmits utterance diagram data generated in step S1707 to the administrator terminal 4 via the connection unit 301.

In step S1709, the evaluation unit 305 determines whether or not there is another call ID, and when there is a call ID remaining, the processing moves on to step S1705(Yes), and when the utterance diagram is generated for all of the call IDs (No), the processing in the evaluation unit 305 is terminated.

The diagram generating table generation processing is explained.

Figure 19:
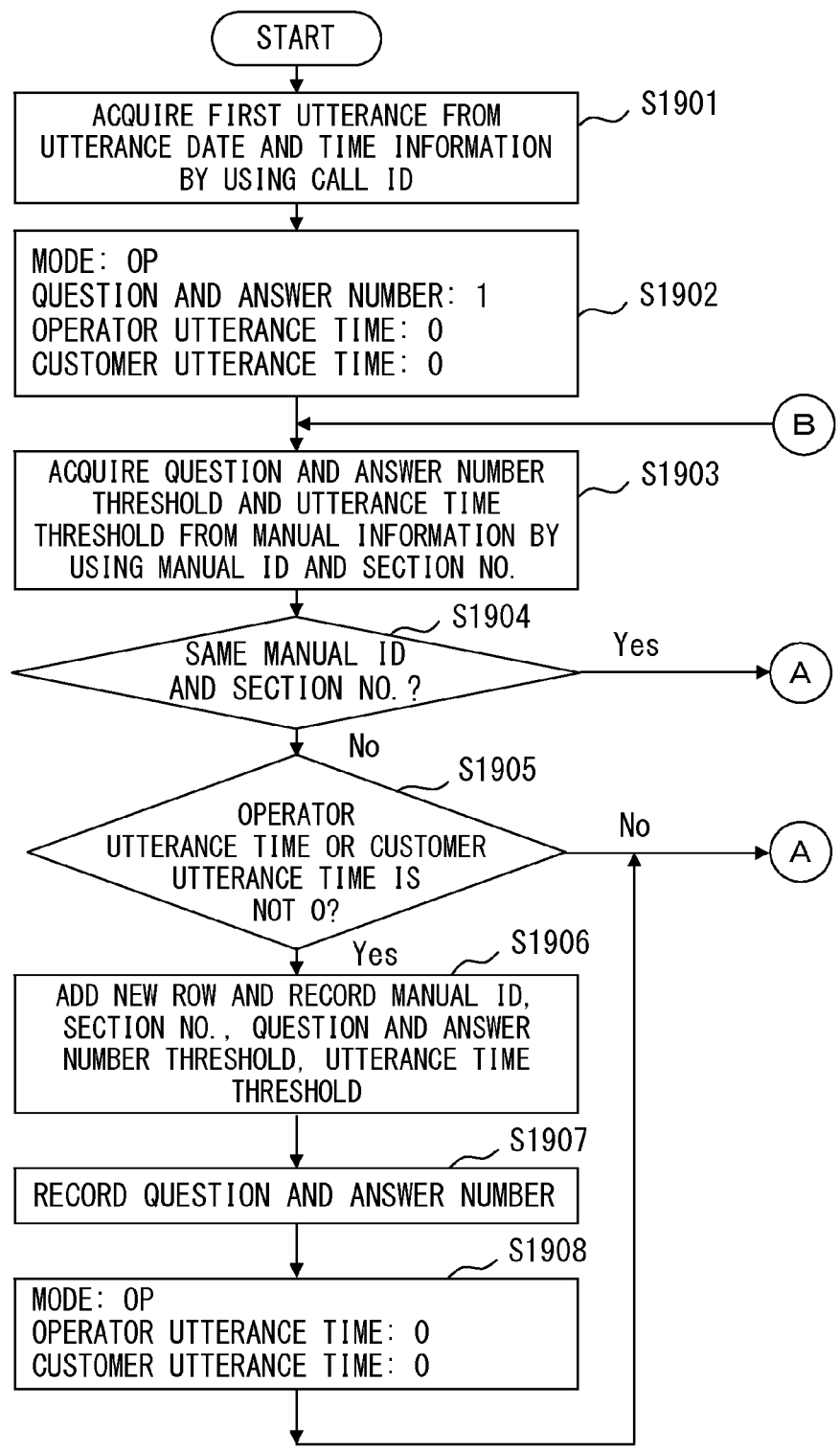
FIG. 19 is a flowchart illustrating an embodiment of operations in the diagram generating table generation processing.
Figure 20:
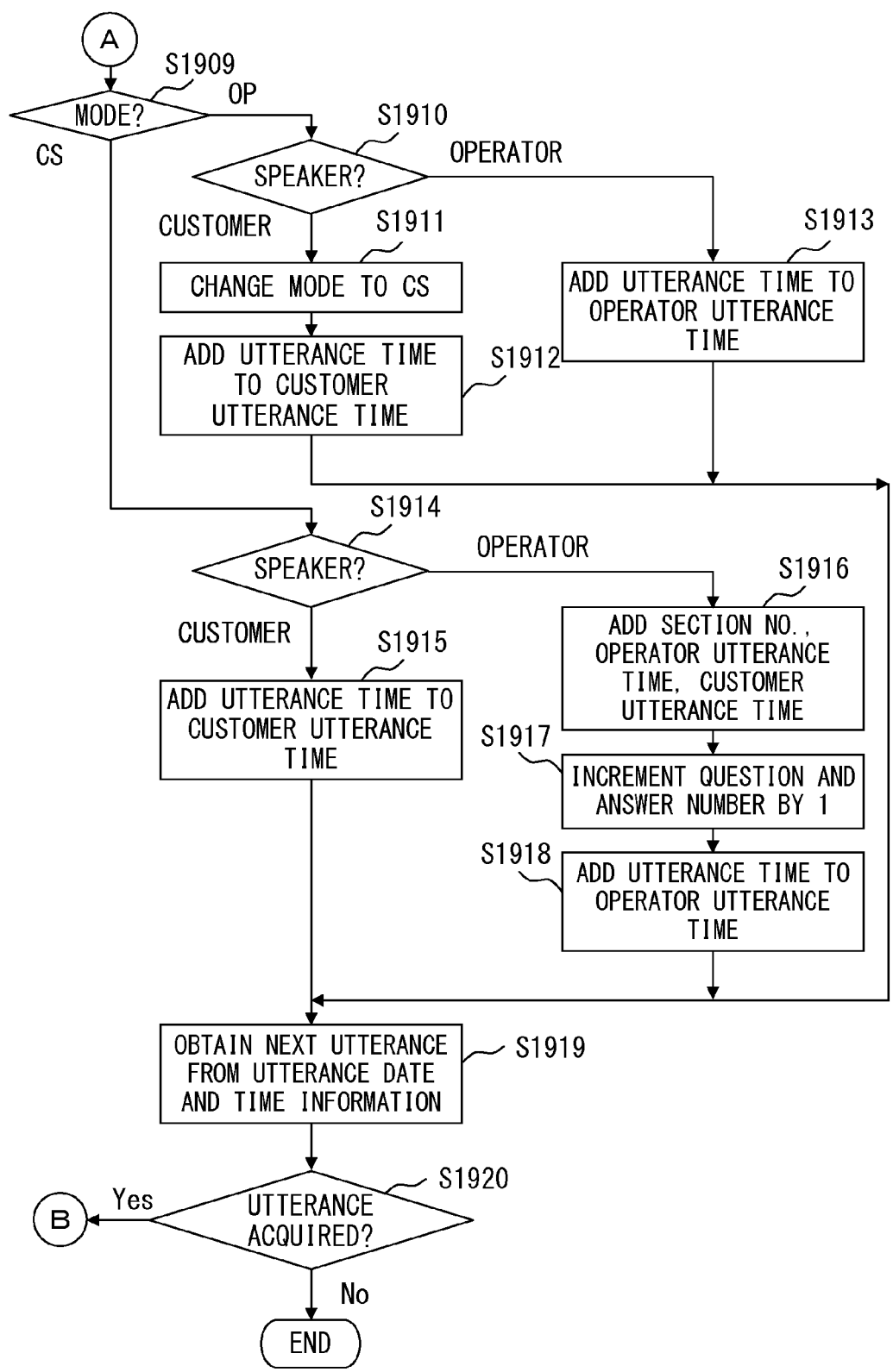
FIG. 20 is a flowchart illustrating an embodiment of operations in the diagram generating table generation processing.

FIG. 19 and FIG. 20 are flowcharts illustrating an embodiment of operations in the diagram generating table generation processing. In step S1901 in FIG. 19, a generation unit 308 of the evaluation unit 305 acquires data of the first "speaker", "utterance start date and time", and "utterance end date and time" from the utterance date and time information by using a call ID. For example, when the administrator selects a call ID, "7840128", calls corresponding to "7840128" are detected from the utterance date and time information. Afterwards, the first utterance start date and time and the utterance end date and time corresponding to "7840128" are obtained. In the case of the utterance date and time information 317 in FIG. 15, the first speaker, utterance start date and time, and utterance end date and time of the call ID, "7840128", are "operator", "2010/8/31:10:00:00", and "2010/8/31:10:00:10".

Next, in step S1901, the generation unit 308 obtains an utterance time period by using the acquired utterance start date and time and utterance end date and time (=utterance end date and time−utterance start date and time). The obtained utterance time period is associated with the acquired speaker and is recorded in a temporary storage region or the like of the storage unit 202.

In step S1902, the generation unit 308 sets initial values to a diagram generating table. The diagram generating table is data used to generate an evaluation result displayed on the input/output unit 608 or the like of the administrator terminal 4. In this example, an explanation is given by using a table structure for reasons of expediency, but the structure does not have to be a table structure illustrated in FIG. 21. FIG. 21 is a diagram illustrating an embodiment of the data structure of the diagram generating table. In FIG. 21, a diagram generating table 2101 includes "manual ID", "section No.", "question and answer threshold", "utterance time threshold", "number of questions and answers", "customer utterance time", and "operator utterance time". The "manual ID" and the "section No." of the utterance date and time information are recorded in association with questions and answers between the operator and the customer in the "manual ID" and the "section No.". In this example, "XJ001" is recorded as a manual ID. In addition; "3", "4", and "-" are recorded as section Nos. "Question and answer threshold" and "utterance time threshold" associated with the manual ID and the section No. of explanation content information are recorded in the "question and answer threshold" and the "utterance time threshold". Questions and answers between the operator and the customer are recorded in association with the customer's utterance time and the operator's utterance time. In this example, "1", "1", "2", "3", "1", "0", and "1" are recorded. Regarding the questions and answers between the customer and the operator, for example, the question and answer between the customer and the operator may be determined by performing a well-known audio analysis of audio files corresponding to the file name of the audio information 316 as the actual spoken words of the customer and the operator.

The customer's utterances and the operator's utterances associated with the same range information (screen information) in chronological order of the date and time or a transit time from the start of the call associated with each of the utterances may be defined as one question and answer.

Alternatively, a pair of utterances of the operator and the customer simply and sequentially from the beginning without performing the audio analysis may be defined as one question and answer.

The customer utterance time and the operator utterance time are recorded in "customer utterance time" and the "operator utterance time". In this example, "2", "4", "2", "7", "6", "0", and "4" are recorded as the customer utterance time (=utterance end date and time−utterance start date and time). In addition, "10", "8", "11", "22", "56", "0", and "9" are recorded as "operator utterance time (=utterance end date and time−utterance start date and time).

It should be noted that as initial values of this example, "OP", which is information indicating that the speaker is an operator, is recorded in a mode storage region that is a temporary storage region of the storage unit 202, and "1", which indicates the first question and answer, is recorded in the "question and answer" in a diagram generating table 2101. Moreover, "0" is set to each of the "operator utterance time" and the "customer utterance time" as initial values.

In step S1903, the generation unit 308 acquires the question and answer number threshold and the utterance time threshold from the explanation content information by using the manual ID and the section No. associated with the call ID, the speaker, the utterance start date and time, and the utterance end date and time, which are currently selected. For example, when the manual ID and the section No. are "XJ001" and "3", respectively, the question and answer number threshold "2" and the utterance time threshold "25", which are associated with "XJ001" and "3", are recorded in the question and answer number threshold region and the utterance time threshold region, respectively, from the explanation content information 313 in FIG. 10.

In step S1904, the generation unit 308 determines whether or not the acquired manual ID and the section No. match the manual ID and the section No. of the currently selected row of the diagram generating table. When the manual ID and the section No. match, the processing moves on to step S1909 (Yes) in FIG. 20, and when the manual ID and the section No. do not match, the processing moves on to step S1905 (No). Note that when the first operator utterance in the utterance date and time information 317 in FIG. 15 is acquire in step S1904, although both the manual ID and the section No. have "-" indicating that there is no display screen, the processing moves on to step S1909 (Yes).

In addition, when "-" is recorded in each of the manual ID and the section No. in the first row of the diagram generating table 2101, the processing moves on to step S1905 upon acquiring the manual ID, "XJ001", and the section No., "3". In other words, because a different manual ID and section No. are acquired, the processing moves on to step S1905. When either one of the manual ID and the section No. is different, the processing also moves on to step S1905.

In step S1905, the generation unit 308 determines whether or not the operator utterance time or the customer utterance time is 0, and when neither utterance time is 0, the processing moves on to step S1907 (Yes), and when at least one utterance time is 0, the processing moves on to step S1909 (No). 0 is a value indicating no uttering has been performed.

In step S1906, the generation unit 308 adds a new row. When the manual ID or the section No. is changed, a row that includes new "manual ID", "section No.", "question and answer number threshold", "utterance time threshold", "question and answer number", "customer utterance time", and "operator utterance time" is added. Afterwards, data is recorded in "manual ID", "section No.", "question and answer number threshold", and "utterance time threshold". For example, in the case of the second row of the diagram generating table 2101, the manual ID, "XJ011", the section No., "3", the question and answer number threshold, "2", and the utterance time threshold, "25", are recorded.

In step S1907, the generation unit 308 records the data in the question and answer number storage region to a site corresponding to the "question and answer number" of the diagram generating table. In the case of the second row of the diagram generating table 2101, an initial value "1" is recorded in the question and answer storage region, and "1" is recorded in the "question and answer number" of the diagram generating table.

In step S1908, the generation unit 308 sets "OP" to a mode storage region of the temporary storage region of the storage unit 202. In addition, "0" is recorded in the "operator utterance time" and "0" is also recorded in the "customer utterance time" in the new row added in step S1906.

Processing in steps S1909-S1913 in FIG. 20 is processing used when the manual ID or the section No. is changed.

In step S1909, the generation unit 308 refers to a mode recorded in the mode storage region, and the processing moves on to step S1910 (OP) when "OP" is recorded and the processing moves on to step S1914 (CS) when "CS" is recorded. The CS is a mode changed in step S1911.

In step S1910, the generation unit 308 determines whether the current speaker is an operator or a customer. When the speaker is an operator, the processing moves on to step S1913 (operator), and when the speaker is a customer, the processing moves on to step S1911 (customer). For example, the determination is made by referring to the data recorded in the "speaker" in the utterance date and time information.

In step S1911, the generation unit 308 changes "OP", which is recorded in the mode storage region, to "CS".

In step S1912, the generation unit 308 adds the customer utterance time to the "customer utterance time" in the diagram generation table. For example, the customer utterance time obtained by using the utterance start date and time and the utterance end date and time of the customer in the utterance date and time information 317 is recorded in the "customer utterance time" in the diagram generating table 2101.

In step S1913, the generation unit 308 adds the operator utterance time to the "operator utterance time" in the diagram generating table. For example, the operator utterance time obtained by using the utterance start date and time and the utterance end date and time of the operator in the utterance date and time information 317 is recorded in the "customer utterance time" in the diagram generating table 2101.

Processing in steps S1914-S1918 in FIG. 20 is processing used in the case when the manual ID or the section No., which correspond to the previous row, and the manual ID or the section No. in the added row are the same.

In step S1914, the generation unit 308 determines whether the current speaker is an operator or a customer. When the speaker is an operator, the processing moves on to step S1916 (operator), and when the speaker is a customer, the processing moves on to step S1915 (customer). For example, the determination is made by referring to the data recorded in the "speaker" in the utterance date and time information.

In step S1915, the generation unit 308 adds the customer utterance time to the "customer utterance time" in the diagram generation table. For example, the customer utterance time obtained by using the utterance start date and time and the utterance end date and time of the customer in the utterance date and time information 317 is recorded in the "customer utterance time" in the diagram generating table 2101.

In step S1916, the generation unit 308 adds a new row. When the section No. is the same, a row that includes new "manual ID", "section No.", "question and answer number threshold", "utterance time threshold", "question and answer number", "customer utterance time", and "operator utterance time" is added. Afterwards, data is recorded in the "manual ID", "section No.", "question and answer number threshold", and "utterance time threshold". For example, in the case of the third row of the diagram generating table 2101, the manual ID, "XJ011", the section No., "3", the question and answer number threshold, "2", and the utterance time threshold, "25", are recorded.

In step S1917, the generation unit 308 obtains a value incremented by 1 from the value recorded in the "question and answer number" in the previous row and records the value in the "question and answer number" in the added row in the diagram generating table.

In step S1918, the generation unit 308 adds the operator utterance time to the "operator utterance time" in the diagram generating table. For example, the operator utterance time obtained by using the utterance start date and time and the utterance end date and time of the operator in the utterance date and time information 317 is recorded in the "operator utterance time" in the diagram generating table 2101.

In step S1919, the generation Unit 308 obtains the next utterance from the utterance date and time information 317. In step S1920, when the evaluation unit 305 acquires a new utterance from the utterance date and time information 317, the processing moves on to step S1903 (Yes), and when the evaluation unit 305 does not acquire the new utterance, the diagram generating table generation processing is terminated, and the processing moves on to evaluation point calculation processing.

The evaluation point calculation processing is explained.

Figure 22B:
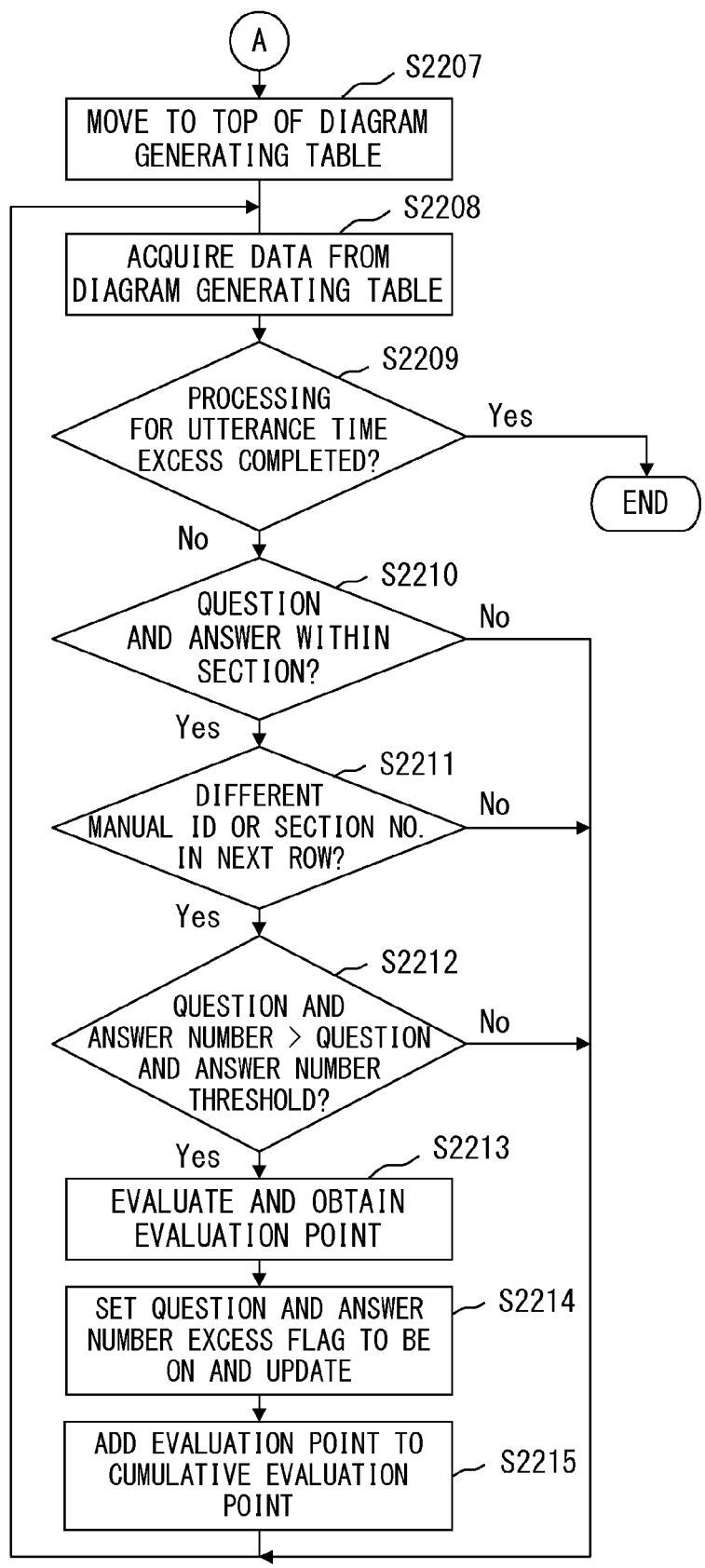

FIGS. 22A and 22B are flowcharts illustrating an embodiment of operations in the evaluation point calculation processing.

In step S2201, an evaluation point calculation unit 309 sets a cumulative evaluation point to the temporary storage region of the storage unit 202. For example, 100 points may be recorded.

In step S2202, the evaluation point calculation unit 309 acquires data from the diagram generating table. The data is the data that is recorded in one row of the diagram generating table 2101, which is the "manual ID", the "section No.", the "question and answer number threshold", the "utterance time threshold", the "question and answer number", the "customer utterance time", and the "operator utterance time". At the beginning of the evaluation point calculation processing, the first one row of the diagram generating table 2101, which is "-", "-", "-", "1", "10", "2", is acquired. Afterwards, data is acquired one row at a time sequentially from the diagram generating table 2101.

In step S2203, the evaluation point calculation unit 309 determines whether or not processing of utterance time excess is performed on all rows recorded in the diagram generating table. In other words, when the processing of utterance time excess is completed for all rows, the processing moves on to step 2207 (Yes), and when the processing of utterance time excess has not been completed for all rows, the processing moves on to step S2204 (No).

In step S2204, the evaluation point calculation unit 309 determines whether or not a question and answer is within a section, and when the question and answer is within the section, the processing moves on to step S2205 (Yes), and when the question and answer is not within the section, the processing moves on to step S2202 (No). Within the section means the manual ID and the section No. are the same in the diagram generating table. Here, one question and answer is a pair of the operator utterance time and the customer utterance time recorded in the same row of the diagram generating table.

In step S2205, the evaluation point calculation unit 309 evaluates the utterance time excess by using evaluation information. FIG. 23 is a diagram illustrating an embodiment of a data structure of the evaluation information. The evaluation information 318 in FIG. 23 includes "over question and answer number threshold", "evaluation point 1", "over utterance time threshold", and "evaluation point 2". A value recorded in "question and answer number" in the diagram generating table and exceeding a value recorded in the "question and answer threshold" is recorded in "over question and answer number". In this example, "1-2" indicating 1 and 2 as values that exceed the question and answer number threshold is recorded. In addition, "3-5" indicating 3, 4, and 5 as values that exceed the question and answer number threshold is recorded, "6-7" indicating 6 and 7 as values that exceed the question and answer number threshold is recorded, and "8-" indicating 8 and larger values as values that exceed the question and answer number threshold is recorded. In the "evaluation point 1", an evaluation point associated with the over question and answer threshold is recorded. Because the evaluation point calculation processing in this example is a point-deduction system from the highest point, the smaller the value exceeding the question and answer number threshold is, the smaller the deduced points are. In this example, "−10", "−20", "−30", and "−40" are recorded in association with each of the values in the over question and answer number threshold. A value recorded in "operator utterance time" in the diagram generating table and exceeding a value recorded in the "utterance time threshold" is recorded in the "over utterance time threshold". In this example, "1-3" indicating 1, 2, and 3 is recorded as values exceeding the utterance time threshold. In addition, "4-6" indicating 4, 5, and 6 is recorded as values exceeding the utterance time threshold, "7-10" indicating 7, 8, 9, and 10 is recorded as values exceeding the utterance time threshold, and "11-" indicating 11 and larger is recorded as values exceeding the utterance time threshold. In "evaluation point 2", an evaluation point associated with the over utterance time threshold is recorded. Because the evaluation point calculation processing in this example is a point-deduction system from the highest point, the smaller the value exceeding the utterance time threshold is, the smaller the deduced points are. In this example, "−50", "−10", "−15", and "−20" are recorded in association with each of the values in the over utterance time threshold.

For example, in the diagram generating table 2101 in FIG. 21, the operator utterance time exceeds the utterance time threshold when the operator utterance time is "56" and the utterance time threshold is "20" in the fifth row, and therefore the value exceeding the utterance time threshold is 56. When the value exceeding the utterance time threshold is 56, "−20" is selected for the evaluation point 2 by using the evaluation information 2301 in FIG. 23.

In step S2206, the evaluation point calculation unit 309 adds the evaluation point obtained in step S2205 to the cumulative evaluation point and stores it in the temporary storage region. For example, in a case in which "−20" is selected as the evaluation point 2, when the current cumulative evaluation point is 100, −20 is added to 100, resulting in 80.

The evaluation point calculation unit 309 designates the first row of the diagram generating table in step S2203, and executes the processing for question and answer number excess in step S2207.

In step S2208, the evaluation point calculation unit 309 acquires data recorded in the "manual ID", the "section No.", the "question and answer number threshold", the "utterance time threshold", the "question and answer number", the "customer utterance time", and the "operator utterance time" of a specified row of the diagram generating table. The first step of the processing for question and answer number excess is to obtain the first row, "-", "-", "-", "1", "10", and "2", of the diagram generating table 2101. Subsequently, data is acquired one row at a time sequentially from the diagram generating table 2101.

In step S2209, the evaluation point calculation unit 309 determines whether or not the processing for question and answer number excess is executed for all rows recorded in the diagram generating table. In other words, the processing for question and answer number excess is terminated when the processing for question and answer number excess has been completed for all rows, and if the processing for question and answer number excess has not been completed for all rows, the evaluation point calculation processing is terminated. When there is a row from which processing for question and answer number excess has not been executed, the processing moves on to step S2210 (No).

In step S2210, the evaluation point calculation unit 309 determines whether or not the question and answer is within the section, and when the question and answer is within the section, the processing moves on to step S2211 (Yes), and when the question and answer is not within the section, the processing moves on to step S2208 (No).

In step S2211, the evaluation point calculation unit 309 determines whether or not the next row is of a different manual ID or different section No., and when the manual ID or the section No. is different, the processing moves on to step S2212 (Yes), and when the manual ID and the section No. are the same, the processing moves on to step S2208 (No). For example, when the processing for question and answer number excess is executed on the third row of the diagram generating table 2101, the processing moves on to step S2212 (Yes) since the section No. of the fourth row is different.

In step S212, the evaluation point calculation unit 309 compares the question and answer number in the current row with the question and answer number threshold, and when the question and answer number>the question and answer number threshold, the processing moves on to step S2210 (Yes), and when the question and answer number is the question and answer number threshold or less, the processing moves on to step S2208 (No). For example, when the processing for question and answer number excess is executed for the third row of the diagram generating table 2101, the question and answer number is 3 and the question and answer number threshold is 2. Since this satisfies the condition whereby the question and answer number>the question and answer number threshold, the processing moves on to step S2212 (Yes).

In step S2213, the evaluation point calculation unit 309 makes an evaluation of the question and answer number excess by using the evaluation information. For example, in the diagram generating table 2101 in FIG. 21, the question and answer number exceeds the question and answer number threshold when the question and answer number is "3" and the question and answer number threshold is "2" in the fourth row, and therefore the value exceeding the question and answer number threshold is 1. When the value exceeding the question and answer number threshold is 1, "−10" is selected for the evaluation point 1 by using the evaluation information 2301 in FIG. 23.

In step S2214, the evaluation point calculation unit 309 sets 1 to an "excess flag" of the evaluation information for update. In the diagram generating table 2101 in FIG. 21, the value 1 is set to the "excess flag" in the fourth row.

In step S2215, the evaluation point calculation unit 309 adds the evaluation point obtained in step S2213 to the cumulative evaluation point, and records the point in the temporary storage region. For example, in a case in which "−10" is selected as the evaluation point 1, when the current cumulative evaluation point is 80, −10 is added to 80 resulting in 70.

It should be noted that in the present embodiment, operators are evaluated by a point-deduction system, but methods other than the point-deduction system may be used.

The utterance diagram generation processing is explained.

Figure 24A:
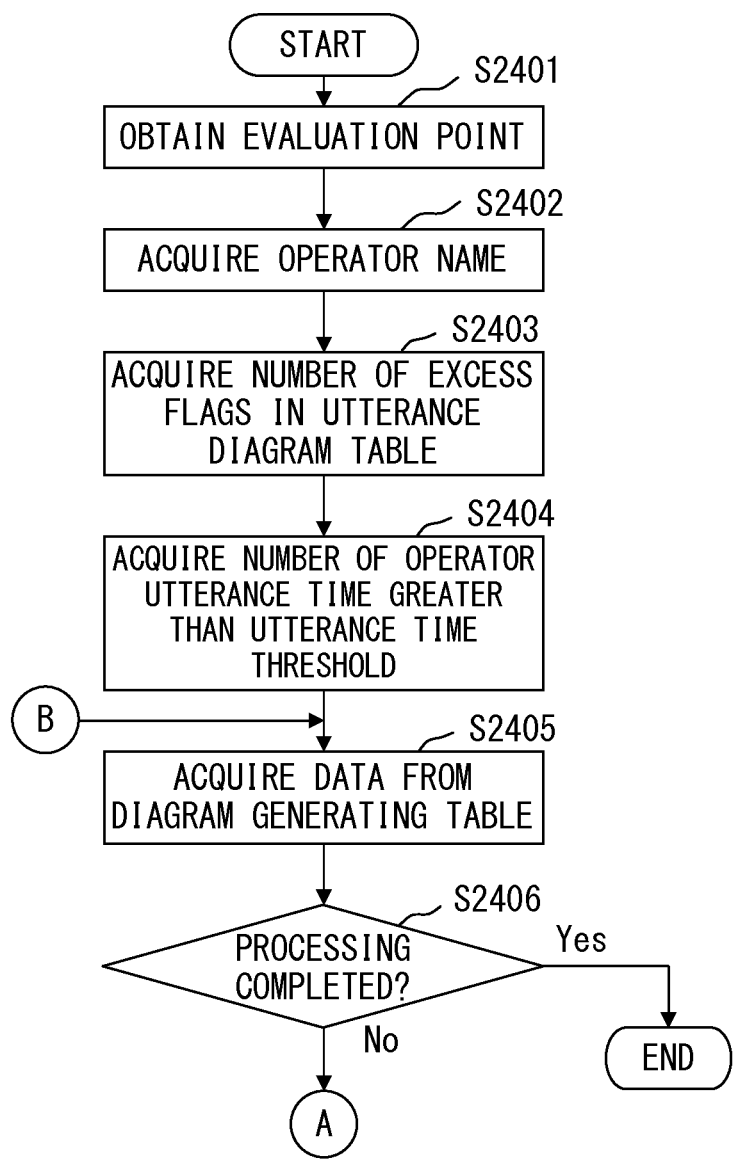
FIGS. 24A and 24B are a flowchart illustrating an embodiment of operations of the utterance diagram generation processing.
Figure 24B:
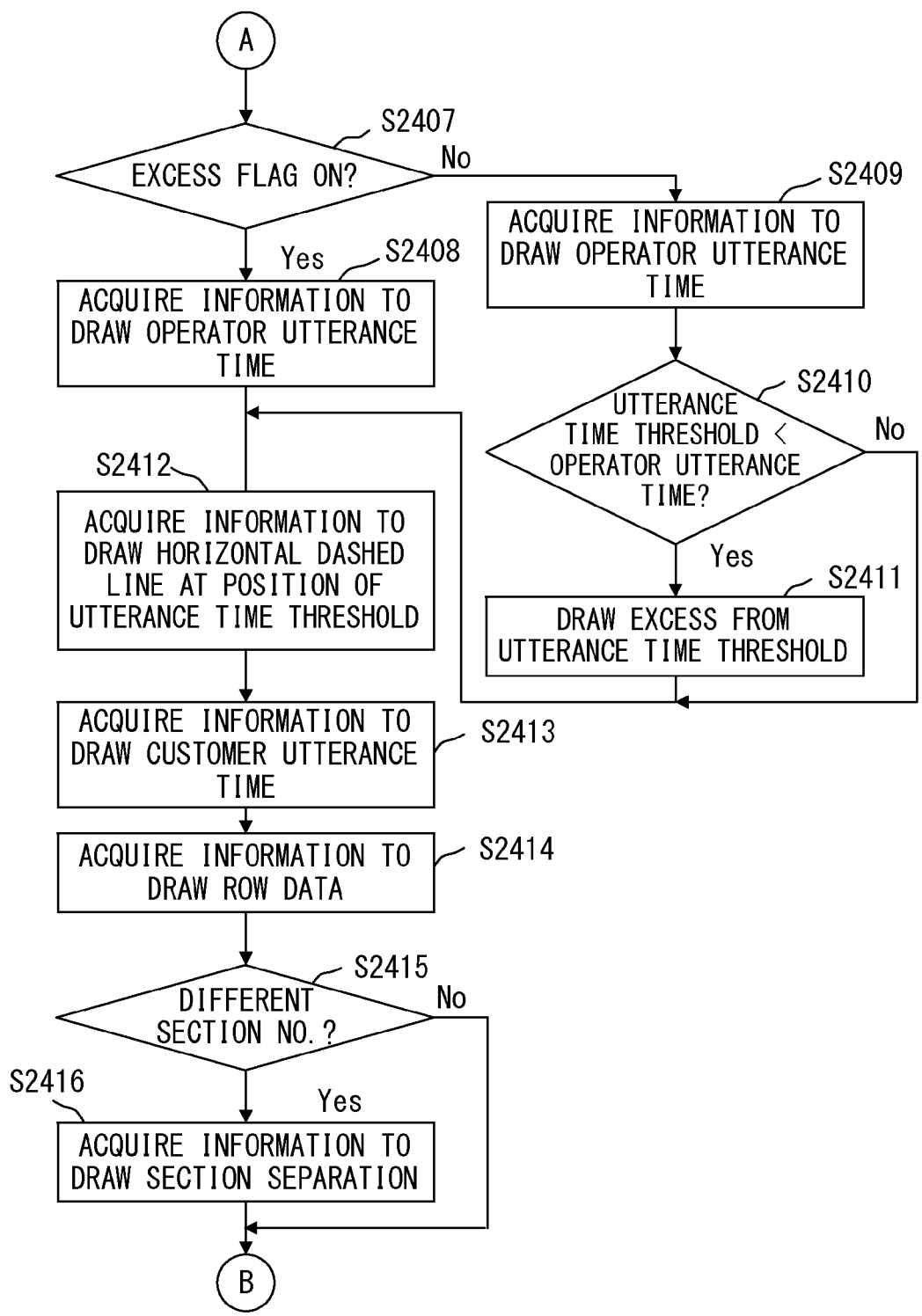
Figure 25:
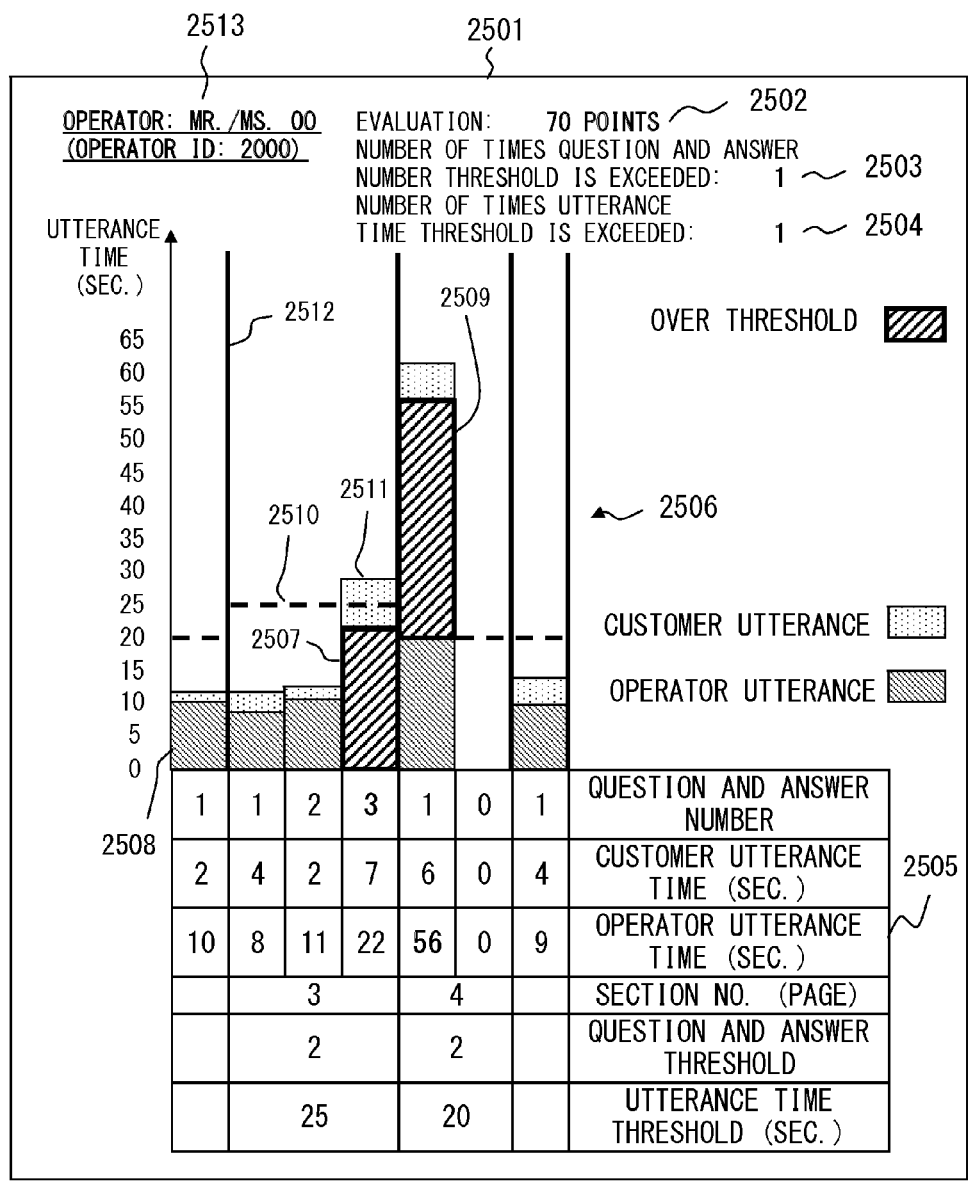
FIG. 25 is a diagram illustrating an embodiment of an utterance diagram displayed on the output device.

FIGS. 24A and 24B are a flowchart illustrating an embodiment of operations of the utterance diagram generation processing. FIG. 25 is a diagram illustrating an embodiment of an utterance diagram displayed on the output device. In step S2401 in FIG. 24A, an utterance diagram generation unit 310 obtains a value of the cumulative evaluation point obtained in step S2215 from the evaluation point calculation unit 309. The utterance diagram generation unit 310 also obtains information such as a display position, a display color, and font information related to the cumulative evaluation point from the drawing information 319. In this example, as the cumulative evaluation point and the information relating to the cumulative evaluation point, information displayed as "evaluation: 70 points" 2502 in the utterance diagram 2501 in FIG. 25 is obtained. In step S2401, drawing information, etc., indicating a template to designate a format for displaying the utterance diagram is obtained.

The drawing information 319 is stored in the storage unit 202. FIG. 26 is a diagram illustrating an embodiment of a data structure of the drawing information. The drawing information 2601 in FIG. 26 includes information such as "item", "message", "display position", "display size", and "display color and font information". In "item", titles etc. to identify a message, a graph, and a table displayed on the screen are recorded. In this example, a title "template" indicating the display format of the utterance diagram 2501, a title "evaluation point" indicating the display format of the cumulative evaluation point, and a title "name" indicating the display format of a name of an operator are stored in the items. A title "number of times of exceeding question and answer number threshold" indicating a display format of the sum of a number of times the question and answer number threshold is exceeded is stored. In addition, a title "number of times of exceeding utterance time threshold" indicating a display format of the sum of a number of times the utterance time threshold is exceeded, and titles "operator utterance time 1" and "operator utterance time 2" each indicating a display format of operator utterance time are stored. For example, in a message associated with "item", contents to be displayed on a screen are recorded in "message". In this example, display positions "message_1", "message_2", . . . "message_7" . . . are stored. In "display position", for example, coordinates to display on the screen messages, graphs, tables and the like associated with "item" are recorded. In this example, the display positions "position_1", "position_2", . . . "position_7" . . . are recorded. In "display size", the display sizes of messages, graphs, tables and the like to be displayed on the screen in association with "item" are recorded. In this example, the display sizes "size_1", . . . "size_2", . . . "size_7" . . . are stored. In "display color", colors of messages, graphs, tables and others displayed on the screen in association with "item" are recorded. In this example, the display color "color_1", "color_2", . . . "color_7" . . . are stored. In the "font information", font information of characters displayed on the screen in association with "item" is recorded. In this example, the display positions "font_1", "font_2", . . . "font_7" . . . are stored.

In step S2402, the utterance diagram generation unit 310 acquires the name of an operator from the operator information, and information such as the display position, the display color, and the font information, which is related to the name, is acquired from the drawing information 310. In this example, information to display the name and information related to the name, as in "OPERATOR: MR./MS. OO (OPERATOR ID: 2000)" 2513 in the utterance diagram 2501 in FIG. 25, is acquired.

In step S2403, the utterance diagram generation unit 310 acquires excess flags from the "excess flag" in the utterance diagram table and totalizes the excess flags. Afterwards, information such as the display position, the display color, and the font information, which is related to the totalized value, is acquired from the drawing information 319. In this example, information to display the totalized value and the information related to the totalized value, as in "NUMBER OF TIMES QUESTION AND ANSWER NUMBER THRESHOLD IS EXCEEDED: 1" 2503 in the utterance diagram 2501 in FIG. 25, is acquired.

In step S2404, the utterance diagram generation unit 310 acquires a value of the "operator utterance time" that is larger than the "utterance time threshold" in the utterance diagram table. Afterwards, information such as the display position, the display color, and the font information, which is related to the value acquired from the drawing information 319, is acquired. In this example, information to display the acquired value and the information related to the acquired value, as in "NUMBER OF TIMES UTTERANCE TIME THRESHOLD IS EXCEEDED: 1" 2504 in the utterance diagram 2501 in FIG. 25, is acquired.

In step S2405, the utterance diagram generation unit 310 acquires data including the "manual ID", the "section No.", the "question and answer number threshold", the "utterance time threshold", the "question and answer number", the "customer utterance time", and the "operator utterance time" one row at a time from the diagram generating table.

In step S2406, the utterance diagram generation unit 310 determines whether or not the processing in steps S2405-S2417 is completed for all rows in the diagram generating table, and when the processing is completed, the utterance diagram generation processing is terminated, and when there is a row that has not undergone the processing, the processing moves on to step S2407 (No).

In step S2407, the utterance diagram generation unit 310 determines whether or not an excess flag is on in the row acquired from the diagram generating table, and when the excess flag is on, the processing moves on to step S2408 (Yes). When the excess flag is not on, the processing moves on to step S2409 (No).

In step S2408, the utterance diagram generation unit 310 acquires information of the operator utterance time in the row currently in process in the diagram generating table. Next, information such as a display position, a display size, and a display color to indicate that the question and answer number exceeds the question and answer number threshold is acquired from the drawing information 319. Information displayed as in a region 2507 of the graph 2506 in the utterance diagram 2501 in FIG. 25 is acquired.

In step S2409, the utterance diagram generation unit 310 acquires information of the operator utterance time in the row currently in process in the diagram generating table. Next, information such as a display position, a display size, and a display color to indicate that the question and answer number does not exceed the question and answer number threshold is acquired from the drawing information 319. Information displayed as in a region 2508 of the graph 2506 in the utterance diagram 2501 in FIG. 25 is acquired.

In step S2410, the utterance diagram generation unit 310 determines whether or not the utterance time threshold<operator utterance time, and when this condition is satisfied, the professing moves on to step S2411 (Yes), and when this condition is not satisfied, the processing moves on to step S2412 (No).

In step S2411, the utterance diagram generation unit 310 acquires information on an excess of the operator utterance time from the utterance time threshold in a row currently in process in the diagram generating table. Next, information such as a display position, a display size, and display color to display the excess is acquired from the drawing information 319. Information displayed as in the region 2509 of the graph 2506 in the utterance diagram 2501 in FIG. 25 is acquired.

In step S2412, the utterance diagram generation unit 310 acquires information to draw a horizontal dashed line at a position of the utterance time threshold. Information such as a display position, a display size, and a display color displayed as in the horizontal dashed line 2510 in the graph 2506 in the utterance diagram 2501 in FIG. 25 is acquired from the drawing information 319.

In step S2413, the utterance diagram generation unit 310 acquires information of the customer utterance time in a row currently in process in the diagram generating table. Next, information such as a display position, a display size, and a display color in which to draw the customer utterance time is acquired from the drawing information 319. Information displayed as in the region 2511 of the graph 2506 in the utterance diagram 2501 in FIG. 25 is acquired. Note that when the question and answer number is smaller than the question and answer number threshold, a column in which the question and answer number is "0", the customer utterance time (seconds) is "0", and the operator utterance time (seconds) is "0" is inserted in this example, but this column may not be inserted.

In step S2414, the utterance diagram generation unit 310 acquires from the drawing information 319 information to draw the question and answer number, the customer utterance time, the operator utterance time, the section No., the question and answer number threshold, the utterance time threshold, the question and answer number, etc., in a row currently in process in the diagram generating table. Information displayed as in a table 2505 in the graph 2506 in the utterance diagram 2501 in FIG. 25 is acquired.

In step S2415, the utterance diagram generation unit 310 determines whether or nor the section No. in the next row is different from the section No. of the current row, and when the section No. is different, the processing moves on to step S2415 (Yes), and when this condition is not satisfied, the processing moves on to step S2405 (No).

In step S2416, the utterance diagram generation unit 310 acquires information to draw a vertical solid line to indicate a section separation. Information such as a display position, a display size, and a display color displayed as in the vertical solid line 2512 of the graph 2506 in the utterance diagram 2501 in FIG. 25 is acquired from the drawing information 319. For the position of the section separation, a switching time may be displayed with reference to the switching date and time in the switching information 1101.

Afterwards, the evaluation unit 305 transmits the information acquired in the processing in steps S2401-S2417 to the administrator terminal 4 as utterance diagram data via the connection unit 301.

Operations of the administrator terminal are explained.

Figure 27:
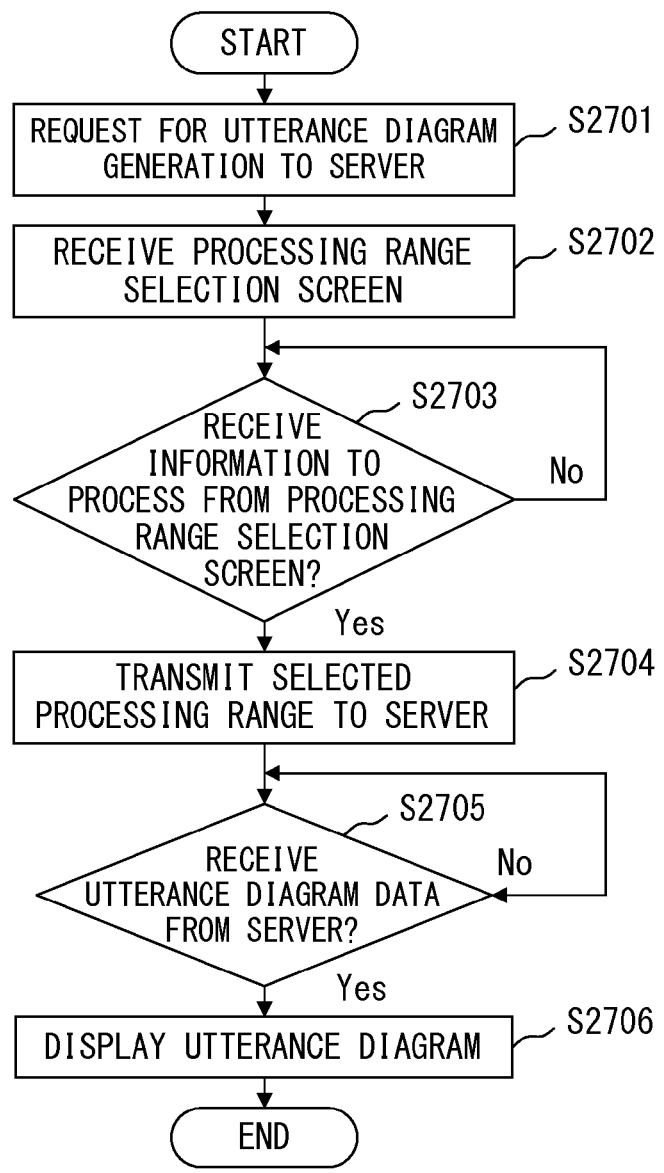
FIG. 27 is a flowchart to indicate an embodiment of operations of an administrator terminal.

FIG. 27 is a flowchart to indicate an embodiment of operations of an administrator terminal. In step S2701, an utterance diagram request unit 701 transmits an utterance diagram display request to a call evaluation device 1 (server) to request generation of an utterance diagram.

In step S2702, the controller 601 receives information on the processing range selection screen transmitted from the call evaluation device 1 and causes the output unit of the input/output unit 608 to display the screen illustrated in FIG. 18 as an example.

In step S2703, the controller 601 receives information such as a call ID, a date range, and an operator ID, which is input to the processing range election screen through the input unit of the input/output unit 608.

In step S2704, the controller 601 transmits the received information such as a call ID, a date range, and an operator ID to the call evaluation device 1.

In step S2705, the utterance diagram reception unit 702 receives from the call evaluation device 1 utterance diagram data indicating an evaluation result of an operator selected by the received information such as a call ID, a date range, and an operator ID. The utterance diagram reception unit 702 transmits to the output unit of the input/output unit 608 information to cause the utterance diagram display unit 703 to display, for example, the utterance diagram 2501 etc. in FIG. 25 by using the utterance diagram data. In step S2706, the output unit of the input/output unit 608 displays the utterance diagram.

According to the embodiments, each explanation screen displayed on the screen of an operator terminal at the time of customer service of an operator is associated with the number of times a question and answer is exchanged between a customer and the operator and the utterance time for each question and answer, and is displayed on a screen of an administrator terminal. As a result, because an administrator such as a supervisor who is in charge of operators refers to the content displayed on the screen and will be able to evaluate whether or not there are problems in the actual services of an operator to a customer, the accuracy in evaluation relating to an operator's customer service can be improved. In addition, by referring to the content displayed on the screen without playing audio files, which had been performed conventionally, evaluation can be made immediately. Furthermore, by displaying the reference values for the number of questions and answers and an operator's utterance time for a single question and answer for each explanation screen, the administrator can give specific advise to the operators.

Furthermore, the present invention is not limited to the above-described embodiments, but various improvements and modification can be made without departing from the gist of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a indicating of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A call evaluation device, comprising:
  a storage unit that stores:
   audio information of a call performed by using a first terminal that a first speaker uses and a second terminal that a second speaker uses, an utterance for each of the first speaker and the second speaker being associated with a date and time or an elapsed time from a start of the call;
   screen identification information to identify screen information displayed on the second terminal; and
   display history information in which the screen identification information of the screen information displayed on the second terminal is associated with a date and time or an elapsed time, from a start of the call, at which the screen is displayed;
  an audio recording unit that associates the utterance for each of the first speaker and the second speaker with the screen information by using the date and time or the elapsed time from the start of the call associated with the utterance for each of the first speaker and the second speaker in the audio information, the date and time or the elapsed time, from the start of the call, at which the screen information is displayed, and the screen identification information of the displayed screen information;
  an evaluation unit that calculates a question and answer number for the screen information by defining a combination of an utterance of the first speaker and an utterance of the second speaker, which are associated with the same screen information, as a question and answer, obtains an utterance time of the second speaker for each question and answer, and generates display information that causes an output device to display the question and answer number for the screen information and the utterance time of the second speaker for each question and answer; and
  a transmission unit that transmits the generated display information to the output device,
  wherein the storage unit further stores a question and answer number threshold, which is a threshold of the question and answer number, and an utterance time threshold, which is a threshold of the utterance time, associated with one another for each piece of screen information,
  wherein the evaluation unit compares the question and answer number calculated for each piece of screen information with the question and answer number threshold, and adds to the display information to cause the output device to display information on a result of the comparison regarding the question and answer number, and
  the evaluation unit compares the utterance time of the second speaker for each question and answer with the utterance time threshold, and adds to the display information to cause the output device to display information on a result of the comparison regarding the utterance time.

2. The call evaluation device according to claim 1,
  wherein the question and answer number threshold is an average value of the question and answer of the first speaker and the second speaker corresponding to the same screen information in a plurality of calls in the past
  wherein the utterance time threshold is an average value of the utterance time of the second speaker corresponding to the same screen information in a plurality of calls in the past;
  wherein the storage unit stores the average value of the question and answer number and the average value of the utterance time of the second speaker in association with the screen information.

3. The call evaluation device according to claim 1,
  wherein the evaluation unit defines the utterance of the first speaker and the utterance of the second speaker, which are associated with the same screen information, in a chronological order of date and time or an elapsed time from a start of the call associated with each utterance as one question and answer.

4. A call evaluation method of causing a computer to evaluate a call performed between a first terminal that a first speaker uses and a second terminal that a second speaker uses, the call evaluation method comprising:
  associating, by the computer, an utterance of the first speaker and an utterance of the second speaker with screen information by using a date and time or an elapsed time from a start of the call which is associated with each of the utterances of the first speaker and the second speaker, and a date and time or an elapsed time from a start of the call which is associated with screen identification information to identify the screen information displayed on the second terminal;
calculating, by the computer, a question and answer number for the screen information by defining a combination of an utterance of the first speaker and an utterance of the second speaker, which are associated with the same screen information, as a question and answer, obtaining an utterance time of the second speaker for each question and answer;
generating, by the computer, display information that causes an output device to display the question and answer number for the screen information and the utterance time of the second speaker for each question and answer;
comparing a question and answer threshold, which is a threshold of the question and answer number associated with each piece of screen information, with the calculated question and answer number and adding to the display information on a result of the comparison regarding the question and answer number;
comparing an utterance time threshold, which is associated with each piece of screen information, with the utterance time of the second speaker for each question and answer and adding to the display information on a result of the comparison regarding the utterance time; and
transmitting, by the computer, the display information to the output device.

5. The call evaluation method according to claim 4, further comprising:
defining the utterance of the first speaker and the utterance of the second speaker which are associated with the same screen information, in a chronological order of date and time or an elapsed time from a start of the call associated with each utterance as one question and answer.

* * * * *